United States Patent [19]

Kawato et al.

[11] Patent Number: 5,256,326
[45] Date of Patent: Oct. 26, 1993

[54] METHODS FOR PREPARING MAGNETIC POWDER MATERIAL AND MAGNET, PROCESS FOR PREPARTION OF RESIN COMPOSITION AND PROCESS FOR PRODUCING A POWDER MOLDED PRODUCT

[75] Inventors: Hiroshi Kawato; Tatsuya Tomioka, both of Kimitsu, Japan

[73] Assignee: Idemitsu Kosan Co. Ltd., Tokyo, Japan

[21] Appl. No.: 702,396

[22] Filed: May 20, 1991

Related U.S. Application Data

[60] Continuation-in-part of Ser. No. 639,293, Jan. 10, 1991, abandoned, and a continuation-in-part of Ser. No. 606,510, Oct. 31, 1990, abandoned, which is a division of Ser. No. 372,833, Jun. 29, 1989, abandoned, and Ser. No. 556,259, Jul. 23, 1990, abandoned, which is a division of Ser. No. 374,149, Jun. 30, 1989, abandoned.

[30] Foreign Application Priority Data

| | | | |
|---|---|---|---|
| Jul. 12, 1988 | [JP] | Japan | 63-171832 |
| Jul. 14, 1988 | [JP] | Japan | 63-173792 |
| Apr. 24, 1989 | [JP] | Japan | 1-101555 |
| Apr. 24, 1989 | [JP] | Japan | 1-101556 |
| Jan. 10, 1990 | [JP] | Japan | 2-1534 |
| Aug. 14, 1990 | [JP] | Japan | 2-213703 |

[51] Int. Cl.$^5$ .......................... H10F 1/00; H10F 1/26
[52] U.S. Cl. .................... 252/62.54; 148/100; 148/101; 148/105; 427/216; 427/221
[58] Field of Search ........... 252/62.54; 148/100, 148/101, 105; 427/216, 221

[56] References Cited

U.S. PATENT DOCUMENTS

| | | | |
|---|---|---|---|
| 3,451,934 | 6/1969 | Hubbard | 252/62.54 |
| 3,650,814 | 3/1972 | Elder | 427/221 |
| 4,462,919 | 7/1984 | Saito | 252/62.54 |
| 4,703,104 | 10/1987 | Matsuo | 528/211 |
| 4,810,572 | 3/1989 | Ooe | 252/62.54 |
| 4,812,507 | 3/1989 | Matsuo | 528/611 |
| 4,818,614 | 4/1989 | Fukui | 427/215 |

*Primary Examiner*—Prince Willis, Jr.
*Assistant Examiner*—Alan D. Diamond
*Attorney, Agent, or Firm*—Antonelli, Terry, Stout & Kraus

[57] ABSTRACT

There is disclosed a process for preparing a resin composition for powder molding, comprising 50 to 97 wt % of a metal or alloy powder and 50 to 3 wt % of a thermoplastic resin having heat resistance and crystallinity, which process comprises dissolving the thermoplastic resin having heat resistance crystallinity in a solvent and at the same time, dispersing therein at least one metal or alloy powder selected from iron, brass, nickel silver, stainless steel and aluminum, having an average particle diameter of not more than 500 $\mu$m to thereby prepare a mixture. In addition, there is disclosed a process for producing a powder molded product which comprises cold compressing molding the above resin composition and then heating the molding at a temperature not less than the melting point of the thermoplastic resin. This powder molded product has excellent dimensional stability against heat, chemical resistance, and mechanical strength. Also, there is disclosed a process for producing a magnetic powder material wherein there is added to a mixture containing a crystalline thermoplastic resin dissolved therein and magnetic powder dispersed therein a bad solvent for the resin to effect precipitation of the resin from the solution system and the resin is adhered or coated onto the magnetic powder. Other methods for forming the magentic powder material are disclosed as a resin-bonded magnetic obtained from such magnetic powder material.

6 Claims, No Drawings

METHODS FOR PREPARING MAGNETIC POWDER MATERIAL AND MAGNET, PROCESS FOR PREPARTION OF RESIN COMPOSITION AND PROCESS FOR PRODUCING A POWDER MOLDED PRODUCT

CROSS REFERENCE TO RELATED APPLICATIONS

This application is a continuation-in-part of (a) application Ser. No. 07/639,293, filed Jan. 10, 1991, (now abandoned) (b) application Ser. No. 07/606,510, filed Oct. 31, 1990, (now abandoned) which is a divisional application of application Ser. No. 07/372,833, filed Jun. 29, 1989 (now abandoned) and (c) application Ser. No. 07/556,259, filed Jul. 23, 1990,(now abandoned) which is a divisional application of application Ser. No. 07/374,149, filed Jun. 30, 1989 (now abandoned).

BACKGROUND OF THE INVENTION

1. Field of the Invention

This invention relates to a method for preparing a magnetic power material or a magnetic composition containing a specific resin excellent in heat resistance, chemical resistance, etc., and a magnetic powder and a method of preparing a resin-bonded type magnet prepared by molding said magnetic powder material or magnetic composition.

The present invention also relates to a process for preparation of a resin composition for powder molding and a process for production of a powder molded product. More particularly it relates to a resin composition as a material for production of a powder molded product having heat dimensional stability, chemical resistance, and so forth nearly equal to those of a metal, and a process for producing the powder molded product with high productivity and efficiency.

2. Description of the Related Arts

Heretofore, resin-bonded type magnets have mainly been prepared by the compression molding method or the injection molding method. Among these, in the compression molding method, a thermosetting resin such as an epoxy resin, etc., has until now been used as a resin binder. However, since the thermosetting resin is extremely low in chemical stability with a lapse of time, the resulting resin-bonded type magnetic powder material is poor in preservability and also poor in production stability. Further, at preparation, it takes one hour or more for thermosetting processing so that productivity is low. Moreover, there are various problems in that a critical temperature for use of the resulting resin-bonded type magnet is 120° C. or so, which is impractical, and it also lacks dimensional stability with a lapse of time.

Conventional resin-bonded type permanent magnets have mainly been prepared by the injection molding method or the compression molding method as disclosed in, for example, Japanese Patent Kokai No. 40003/1982, No. 173804/1983, No. 16002/1983, etc., and as a binder resin, a polyamide, ethylene-vinyl acetate copolymer, etc. in the injection molding method and an epoxy resin in the compression molding method have been used.

However, a resin-bonded permanent magnet using a polyamide or an epoxy resin as the binder has poor humidity resistance whereby there are problems of rust generation and diminished characteristics due to a change in dimension with a lapse of time, and its critical temperature for use is as low as 120° to 150° C.

As the method for obtaining a resin-bonded type magnet by cold compression molding after coating magnetic powder with a thermoplastic resin, various ones have been known. For example, in Japanese Patent Kokai No. 104254/1975, a method is disclosed in which magnetic powder particles coated with Nylon precipitated from about 2% by weight of a solution are subjected to compression molding to obtain a resin-bonded type magnet. Further, in Japanese Patent Kokai No. 186908/1983, there is disclosed a method in which ferrite series magnetic powder is suspended in a radical polymerizable monomer solution to carry out polymerization, and then the magnetic powder particles coated their surfaces with resin are subjected to compression molding in a magnetic field to obtain a resin-bonded type magnet having a magnetic anisotropy. However, these are unsatisfactory in resin characteristics such as heat resistance, chemical resistance, etc., so they could not be used practically.

In recent years, a crystalline resin excellent in heat resistance, chemical resistance and dimensional stability, such as polyphenylenesulfide (PPS), polyether ether ketone (PEEK), etc. has been known. in Japanese Patent Kokai No. 113403/1985, there is disclosed the method in which the above PPS, PEEK and magnetic powder are fused and kneaded, and then a rare earth resin-bonded type magnet is obtained by injection molding.

However, the crystalline resin such as PPS or PEEK requires a high temperature for fusion molding such as 350° C. or higher, so that there is a disadvantage in that magnetic powder of the rare earth is likely to be oxidized at molding. In addition to the above, various methods have been proposed and for example, in Japanese Patent Kokai No. 134517/1974 and No. 103309/1984, there are proposed the methods in which a mixture or a coated material of thermoplastic resin powder such as a polyamide, a polyolefin, a polycarbonate, etc. and magnetic powder is subjected to hot press molding. However, in this method, when removing a molded material from the mold, it takes a long time for cooling and solidification so that there is a problem of low productivity. Also, in Japanese Patent Kokai No. 186908/1983, there is described a radical polymerizable monomer such as methyl acrylate, etc. is brought into contact with ferrite series magnetic powder to carry out polymerization, and after coating the powder surface with the polymer, cold press molding is carried out. However, since heat resistance and chemical resistance of the binder resin are insufficient, it has not yet been used practically.

Further, in Japanese Patent Kokai No. 279106/1986, a technique is proposed in which by using PPS as a binder, after PPS is fused under heating and kneaded with magnetic powder, injection molding or extrusion molding is carried out. However, in order to carry out such a fusion under heating and kneading, a treatment at high temperature for a long time should be carried out since fluidity in the kneaded material is required. This treatment results in a serious problem that the magnetic characteristics are lowered since oxidation of the magnetic powder is promoted.

In powder metallurgy, a sintered molding has heretofore been produced by a process comprising the steps of compression molding using an organic binder, degreasing, and sintering. This process, however, has disadvantages in that a large amount of energy and a long time are needed at both the degreasing and sintering steps, dimensional accuracy is poor because of its large shrinkage after sintering, and breaking and cracking readily occur.

Moreover those parts which are long, thin or grooved are difficult to produce because of dimensional changes due to shrinkage at the time of sintering.

On the other hand, copper base alloys containing zinc, such as brass and nickel silver, have a disadvantage of shortening the service life of a sintering furnace.

In order to overcome the above problems, Japanese patent Application Laid-Open No. 38641/1976 discloses a molding obtained by a powder metallurgical technique using a thermosetting resin (e.g. epoxy resin) as a binder. An epoxy resin, however, has disadvantages in that a long time is required for calcination after compression molding, the resulting molding is large in dimensional changes under an atmosphere of high temperature or high humidity as compared with a sintered metal or diecast, which is unsuitable for practical use, and the mechanical strength of the molding is small.

In order to overcome the above problems, Japanese Patent Application Laid-Open No. 104254/1975 discloses a powder metallurgical technique in which various fine powders are coated with Nylon resin (5 to 35 vol %) and then compression molded to produce a molding, so that the molding can be used as it is without degreasing and sintering. This technique, however, has not been put to practical use because the Nylon resin is poor in heat resistance, mechanical strength and chemical resistance.

For molding, therefore, the powder metallurgical technique has not been applied, and rather injection molding in which a resin content of at least 35 vol % is required has been employed in view of advantages of strength and moldability. For example, composition having a high specific gravity as prepared by charging a metal or metal oxide powder in a high concentration are disclosed in Japanese Patent Application Laid-Open Nos. 258952/1988, 202653/1988, 183956/1988 and 142051/1988. This composition, when charged with a high specific gravity metal such as iron powder or copper powder, is used in production of fly wheel or die cast moldings, and the resulting molding has a mechanical strength comparable with that of a resin and is sufficiently durable for practical use.

In the case of injection molding, suitable fluidity is needed at the time of molding and, therefore, the amount of the powder charged is limited and a high specific gravity composition cannot be attained, by charging the powder in a higher concentration. Even if the high specific gravity is attained, the resulting molding still has a larger coefficient of linear expansion than the metal or die case molding and is increased in the dimensional changes under high temperature conditions, unsuitably for practical use.

Although the injection molding is effectively employed in production of moldings having a complicated shape, in the case of production of a small number of moldings which are simplified in the shape but in various types of shapes, it suffers, from disadvantages in that abrasion of the die due to the charged powder is seriously large, leading to an increase of cost for the maintenance of the die, and no mass production effect can be obtained.

The present inventors made an extensive investigation to overcome the above problems of the prior art and to produce a powder molded product having heat stability and chemical resistance comparable with those of metals, and having a sufficiently high mechanical strength for practical use, with high efficiency.

SUMMARY OF THE INVENTION

An object of the present invention is to provide a method for preparing a magnetic powder material and a magnetic composition suitable for molding of a resin-bonded type magnet.

Another object of the present invention is to provide a method of producing a resin-bonded type magnet which is excellent in dimensional stability with a lapse of time, dimensional stability at molding, etc. as well as having excellent heat resistance and chemical resistance and excellent magnetic characteristics.

Also, a further object of the present invention is to provide such methods for preparing the above resin-bonded type magnet and magnetic powder material by simple procedures with high productivity and efficiency.

The present invention is directed to a method for preparing the magnetic powder material which comprises, to a mixture obtained by dissolving a crystalline thermoplastic resin with heat resistance in a solvent and dispersing magnetic powder, effecting (1) addition of a bad solvent of said resin, or (2) volatilization or evaporation of the solvent in said mixture, or cooling said mixture.

Also, the present invention relates to a method for preparing the above magnetic powder material which comprises dissolving by heating a crystalline thermoplastic resin with heat resistance in a solvent, and then dispersing and mixing a gel obtained by cooling and magnetic powder, and crushing the resultant simultaneously with volatilizing or evaporating the solvent.

Further, the present invention relates to a method for preparing the above resin-bonded type magnet, characterized in that the above magnetic powder material is compression molded.

The present invention further relates to a resin-bonded type magnetic composition which comprises a polymer having a repeating unit represented by the formula:

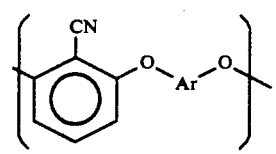 (I)

wherein Ar represents

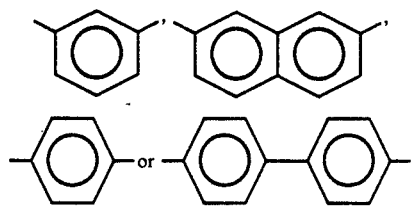

and a limiting viscosity [η] in p-chlorophenol as a solvent at 60° C. of 0.2 dl/g or more, and magnetic powder.

Also, the present invention involves the use of powder material (A) which comprises 99.5 to 60% by volume (99.9 to 85% by weight) of magnetic powder and 0.5 to 40% by volume (0.1 to 15% by weight) of the above polymer having the repeating unit of formula (I) coated on or adhered to said magnetic powder.

Further, the present invention relates to a resin-bonded type magnet comprising molding the resin-bonded type magnetic composition or the magnetic powder material (A).

Moreover, the present invention relates to a method for preparing the above magnetic powder material (A) which comprises, to a mixture obtained by dissolving the above polymer in a solvent and dispersing magnetic powder, effecting (1) addition of a bad solvent of said polymer, or (2) volatilization or evaporation of the solvent in said mixture, or (3) cooling said mixture.

Also, the present invention relates to a method for preparing the above magnetic powder material (A) which comprises dissolving by heating the above polymer in a solvent, and then dispersing and mixing the gel obtained by cooling and magnetic powder, and grinding the resultant simultaneously with volatilizing or evaporating the solvent.

Furthermore, the present invention relates to a method for preparing the above resin-bonded type magnet, characterized in that the above magnetic powder material (A) is subjected to molded.

It has been discovered that the above problems of powder molding can be overcome by choosing the type of the binder resin and the type and particle size of a powder as a compression molding material, and by modifying a molding method. An embodiment of the present invention has been completed on the findings.

The present invention also provides a process for preparing a resin composition for powder molding, comprising 50 to 97 vol % of a metal or alloy powder and 50 to 3 vol % of a thermoplastic resin having heat resistance and crystallinity, which process comprises dissolving the thermoplastic resin having heat resistance and crystallinity in a solvent and at the same time, dispersing therein at least one metal powder selected from iron, brass, nickel silver, stainless steel and aluminum, or an alloy powder containing the metal to prepare a mixture, and then gassifying or evaporating the solvent of the mixture. In place of the gassification or evaporation of the solvent of the mixture, the mixture may be cooled. Moreover the solvent may be gassified or evaporated after cooling the mixture.

The present invention further relates to a process for producing a powder molded product which comprises cold compression molding the above resin composition for powder molding and then heating the resulting molding at a temperature higher than the melting point of the thermoplastic resin having heat resistance and crystallinity.

DESCRIPTION OF PREFERRED EMBODIMENTS

In one aspect the present invention, as a polymer to be blended with magnetic powder, or a polymer (a binder) to be coated on or adhered to magnetic powder, the polymer having a repeating unit represented by the above formula (I), i.e. polycyanoaryl ether is used. Here, the polymer having a repeating unit represented by the formula (I) wherein Ar is

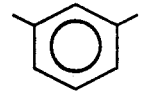

(hereinafter abbreviated to as "PEN-R") is disclosed in Japanese Patent Kokai No. 223226/1987. Also, the polymer having a recurring unit wherein Ar is

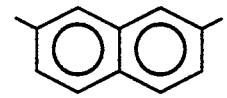

(hereinafter abbreviated to as "PEN-N") is disclosed in Japanese Patent Kokai No. 162523/1986. Further, the polymer having a repeating unit wherein Ar is

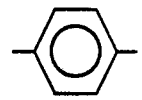

(hereinafter abbreviated to as "PEN-H") is disclosed in Japanese Patent Kokai No. 57619/1986 and the polymer having a repeating unit wherein Ar is

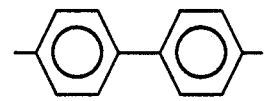

(hereinafter abbreviated to as "PEN-B") is disclosed in Japanese Patent Kokai No. 147439/1985.

The polymer to be used in the present invention has the aforesaid repeating unit as a limiting viscosity in p-chlorophenol as a solvent at 60° C. of 0.2 dl/g or more, preferably 0.4 to 2.0 dl/g or more. If the limiting viscosity [$\eta$] is less than 0.2 dl/g, the strength of the resulting molded product is extremely low and it loses heat resistance. On the other hand, if it exceeds 2.0 dl/g, the product sometimes becomes inferior in molding workability.

On the other hand, the type of the magnetic powder is not particularly limited and various ones can be optionally selected depending on the purposes. Specific examples thereof include ferrite powder such as $BaO \cdot 6Fe_2O_3$, $MnO \cdot ZnO \cdot Fe_2O_3$, $\gamma$-$Fe_3O_4 \cdot PbO \cdot 6Fe_2O_3$, $SrO \cdot 6Fe_2O_3$, etc.; arnico powder such as MCA160, MCA230, MCB500, MCB580, MCB4DOH, etc. of JIS standard; rare earth cobalt powder such as $SMCo_5$, $PrCo_5$, $NdCo_6$, $MMCo_5$ (here, MM represents a Misch metal), $SmPrCo_5$, $SmPrNdCo_5$, $SmMMCo_5$, $R_2Co_{17}$ (wherein R represents a series of rare earth elements of atomic numbers from 58 to 71), $Sm_2Co_{17}$, $Pr_2Co_{17}$, $Sm_2(Co,Fe,Cu)_{17}$ and $Sm_2(CO,Fe,Cu,M)_{17}$ (wherein M represents Ti, Zr or Hf). Further, there can be mentioned rare earth-iron-boron powder ($Nd_2Fe_{14}B$, $Nd_2Fe_{12}Co_2B$, $Pr_2Fe_{14}B$, etc.). In addition, there can be mentioned Fe-Cr-Co magnetic powder, Mn-Al-C magnetic powder, Pt-Co magnetic powder, Pt-Fe magnetic powder, cunife magnetic powder, etc.

In the present invention, the above magnetic powder can be used as it is by mixing with the above polymer, but in order to prevent oxidation of the magnetic powder and improve adhesiveness into a binder (the polymer), it is preferred to treat the surface of the magnetic powder with a coupling agent in an amount of 5% by weight or less, particularly 0.5 to 2.0% by weight or so based on the magnetic powder. Here, coupling agents which can be used include various ones but titanate series and silane series ones are preferable. The titanate series coupling agents include isopropyltriisostearoyl titanate, isopropyltrioctanoyl titanate, isopropyltris(dioctylpyrophosphate)titanate, isopropyldimethacrylisostearoyl titanate, isopropyltri(N-aminoethyl-aminoethyl) titanate, isopropyltridodecylbenzenesulfonyl titanate, isopropylisostearoyldiacryl titanate, isopropyltri(deoctylphosphate)titanate, isopropyltricumylphenyl titanate, tetraisopropylbis(dioctylphosphite)titanate, tetraoctylbis(ditridecylphosphite)titanate, tetra(2,2-diallyloxymethyl-1-butyl)bis(ditridecyl)phosphite titanate, bis(dioctylpyrophosphate)oxyacetate titanate, bis(dioctylpyrophosphate)ethylene titanate, etc. These may be used singly or in combination. Also, the silane series coupling agents include, γ-mercapto-propyl-trimethoxysilane, 2-styrylethyltrimethoxysilane, N-β-(aminoethyl)γ-amino-propyl-trimethoxysilane, β-(3,4-epoxycyclohexyl)ethyl-trimethoxysilane, γ-aminopropyl-trimethoxysilane, γ-glycidoxypropyltrimethoxysilane, phenyltrimethoxysilane, methyldimethoxysilane, etc. and these may be used singly or in combination. Further, the titanium series coupling agents and the silane series coupling agents can be used in combination.

The surface treatment by the coupling agent can be carried out by wetting the magnetic powder with a 5 to 20% by volume of the coupling agent solution (using an alcohol or toluene as a solvent), and then drying it at a temperature not less than room temperature, preferably 120° to 150° C. According to the surface treatment due to the coupling agent, water repellent property and lubricity are applied to the magnetic powder so that the mechanical strength, etc. of the resin-bonded type magnet obtained after molding can be improved.

The magnetic powder material and the magnetic composition of the present invention are basically composed of the aforesaid polymer and magnetic powder, and their formulating ratio cannot be determined definitely, but generally it is preferred to formulate 0.5 to 40% by volume (0.1 to 15% by weight) of the polymer.

However, when the resin-bonded type magnet is molded by the injection molding method, it is preferred to formulate within the range of 20 to 404 by volume (5 to 15% by weight). If it is less than 20% by volume (5% by weight), it is difficult to obtain fluidity thereof whereby moldability becomes poor, while if it exceeds 40% by volume (15% by weight), the packing ratio of the magnetic powder becomes low, whereby magnetic characteristics become remarkably low.

Also, when the compression molding method is used, it is preferred to formulate 0.5 to 20% by volume (0.1 to 5% by weight) of the polymer, and 0.5 to 10% by volume (0.1 to 4% by weight) is more preferable. In compression molding, if the content of the polymer is less than 0.5% by volume (0.1% by weight), it becomes difficult to act the role of the binder so that shape can not be retained, while if it exceeds 204 by volume (5% by weight), magnetic characteristics become low.

Anyway, in order to improve magnetic characteristics, it is necessary to make the amount of the polymer as small as possible, and increase the amount of the magnetic powder. Decreasing the amount of the powder causes disadvantages in that mechanical strength becomes lower, etc., so that the amount of the polymer should be determined by considering the balance of the magnetic characteristics and the mechanical strength.

The magnetic powder material of the present invention can be obtained by coating or adhering the above polycyanoaryl ether type polymer to the above magnetic powder with a ratio of 0.5 to 40% by volume (0.1 to 15% by weight), preferably 0.5 to 10% by volume (0.1 to 4% by weight). As the method for preparing the magnetic powder material by coating or adhering the polymer to the magnetic powder, there may be mentioned the method in which said polymer and the magnetic powder are mixed in the temperature range between the crystal fusion initiating temperature and the melting point of the polymer, and then the mixture is cooled to coat thereon or adhere thereto; by utilizing the crystallinity of the polymer. However, this method requires high temperatures so that there is danger of causing deterioration of the magnetic powder due to oxidation, and sometimes it is difficult to uniformly disperse the magnetic powder and completely coat or adhere the polymer thereon. Accordingly, as preferred methods for avoiding these problems, there can be mentioned (1) the method in which coating or adhering is effected by precipitating the polymer from the solution system due to phase separation after dissolving the polymer in a solvent, (2) the method in which coating or adhering is effected by precipitating the polymer by volatilizing the solvent, etc.

In the method for preparing the magnetic powder material of the present invention, the aforesaid polycyanoaryl ether type polymer can be coated or adhered to the magnetic powder by the aforesaid methods, and the coated or adhered amount of the polymer at this time should be 0.5 to 40% by volume (0.1 to 15% by weight) (ratio based on the total magnetic powder material) as already described. If the coated or adhered amount is less-than 0.5% by volume, it becomes difficult for the polymer to act the role of the binder so that shape can not be retained at molding, while if it exceeds 40% by volume, magnetic characteristics become low, An amount of the coated polymer can be calculated by dissolving the polymer of the magnetic powder material to remove with N-methylpyrrolidone, etc., having strong dissolving power and measuring the weight decreased.

Next, as the solvent for dissolving the above polymer, it is preferred to use a polar solvent having high dissolving power, which can dissolve said polymer, and may include, for example, N-methylpyrrolidone,ct-chloronaphthalene, dichloroacetic acid, 1,3-dimethyl-2-imidazolidinone, dimethylsulfoxide, dimethylacetamide, dimethylformamide, p-chlorophenol, etc.

The kind of the solvent to be used should be optionally selected depending on the kinds or molecular weights of the polymer, and generally, N-methylpyrrolidone is preferred.

Also, an amount of the solvent may be varied depending on the amount of the polymer supplied, or kinds, grain size distribution, wettability, adhesivensess to the polymer of the magnetic powder, etc. For example, when an anisotropic one such as ferriete magnetic powder or samarium cobalt magnetic powder is coated with a polymer, in order to decrease aggregation of the magnetic powder with each other, it is preferred to make the condition wherein a mixed slurry of the magnetic powder and the polymer solution are diluted to about 5 to 50% by weight. Accordingly, a ratio of the amount of the polymer to the solvent, i.e. a polymer concentration (amount of charged resin (g)/amount of solvent (dl)) is preferably 0.1 to 5 g/dl.

Also, in order to dissolve the polymer in a solvent, it is carried out by supplying the above solvent and the polymer in a powder state into a suitable stirring tank and then heating while stirring. The heating temperature at this time should be raised, for example, to 190° C. or higher when N-methylpyrrolidone is used as the solvent. Heating and stirring are preferably continued to uniformly dissolve the polymer.

Coating the polymer on the magnetic powder by using the thus prepared polymer solution is carried out by the four kinds of methods mentioned hereinbelow. The method employed for the polymer coating can be optionally selected depending on the kinds of the polymer solution or magnetic powder to be used or conditions thereof.

(1) Method of Using a Bad Solvent

By adding a bad solvent of the polymer to a hot solution of said polymer (a mixture wherein magnetic powder is dispersed in a solution dissolving the polymer therein), the solubility thereof can be made lower so that the polymer can be precipitated on the magnetic powder. The bad solvent means a solvent in which the polymer is insoluble or little soluble and which precipitates the polymer.

The dropwise addition of the bad solvent is preferably started at a temperature wherein the hot solution of the polymer is uniformly dissolved. That is, the temperature whereat almost all the polymer in the solution does not start to precipitate upon cooling, and is preferably the temperature not more than the boiling point of the bad solvent.

As the bad solvent, an organic solvent other than N-methylpyrrolidone (190° to 200° C.) and p-chlorophenol (50° C. or higher), and water can be employed; so that it may be optionally selected depending on the molecular weight of the polymer to be used, concentration of the polymer and solubililty of the polymer depending on the dissolution temperature. Specific examples of the bad solvents include water, methanol, isopropyl alcohol, acetone, toluene, etc. Also, solvent with high boiling point such as a-chloro naphthalene, 1,3-dimethyl-2-imidazolidinone, dimethylsulfoxide, dimethylacetamide, dimethylformamide, N-methylpyrrolidone, etc. may be used as the bad solvent depending on the temperature.

The added amount of the bad solvent depends on the concentration of the polymer solution, but generally an amount equivalent to the amount of the basic solvent or more is preferred. As to the method of addition, it is preferred to supply with a liquid drops as minute as possible (for example, a liquid in the atomizing state) under vigorous dispersion and stirring.

(2) Method Due to Volatilization and Evaporation

The method in which the solvent is volatilized and evaporated to precipitate the polymer on the magnetic powder may be carried out, for example, by supplying with a liquid transferring pump, a mixed slurry (mixture) of the magnetic powder, the polymer solution and a low boiling point solvent having high solubility to the polymer to a heating tube overheated and explosively blowing out in a room with high temperature and vacuum, to evaporate (volatilize) the solvent in a moment.

However, in this case, when selection of a mixed solvent with a low boiling point solvent having high solubility to the polymer is difficult, evaporation (volatilization) of the solvent in a moment can be carried out with a good solvent alone if temperatures of the heating tube and the room with high temperature and vacuum are not less than the boiling point of the solvent.

As an apparatus for carrying out such procedures, there may be applied the Cracks System (an instantaneous vacuum drying apparatus) produced by Orient Chemical Industry Co., Ltd.)

(3) The Method By Cooling

By cooling a hot solution of the polymer (a mixed solution of magnetic powder dispersed in a solution of the dissolved polymer) and decreasing the solubility of the polymer, the polymer can be precipitated on the magnetic powder. Further, a low molecular weight component, which is a part of the solution and cannot be precipitated, can be precipitated by adding a bad solvent.

More specifically, it can be carried out by mixing the hot solution of the polymer uniformly dissolved in a stirring tank having a jacket with magnetic powder, and cooling the mixture to room temperature while effecting dispersion and stirring with a wet dispersing and stirring apparatus and flowing a cold water in the jacket.

Further, by adding a bad solvent with an amount equivalent to or more than the volume of the polymer solution, almost all of the polymer can be precipitated. As the above wet dispersing and stirring apparatus, there may be applied, for example, an ultrahomomixer produced by Nippon Seiki Seisakusho K.K. or an ultradisperser produced by IKA K.K.

The cooling rate and precipitating time may optionally be selected since the time of forming precipitates is different (depending on the solubility of the polymer or dissolution conditions, but generally it is preferred to provide a precipitating time of one hour or more after cooling to room temperature for 1 to 2 hours. If no precipitation time is provided, it may cause delay in precipitation of the polymer due to its supercooled state.

Also, as the bad solvent that may be used there are, for example, water, methanol, isopropyl alcohol, acetone, toluene, etc.

Also, particularly, the case where cooling is effected by using a concentrated solution of the polymer is as follows:

When a hot concentrated solution is cooled, it does not stop at a jelly-like state but rather as solid material such as wax or soap. By using this physical property, it can be effected to coat the polymer on the magnetic powder simultaneously with grinding thereof. That is, by adding dropwise a hot solution of the polymer to magnetic powder preheated to a temperature which is the same as the hot solution of the polymer, under high speed dispersion and stirring, and cooling, the polymer can be coated on the magnetic powder and grinding can be carried out simultaneously by precipitating and solidifying the polymer.

As the stirring disperser, a dry type disperser such as Henshel mixer, high speed mixer and super mixer, etc. can be used. At the time of disperse by these mixers, grinding ability can be increased by adding a ball made of ceramics such as an alumina, etc.

Also, the concentration of the polymer solution is preferably 2 (g/dl) or more. If it is less tha 2 (g/dl), it becomes a jelly-like state and aggregation is inevitable so that it is impossible to carry out coating and grinding simultaneousiy. In this method, when the amount of the solvent is decreased as little as possible, productivity can be increased but as the amount of the solvent is decreased, the polymer does not dissolve completely in the solvent whereby a uniform solution cannot be obtained. That is, the solution concentration may optionally be selected at which coating and grinding can be carried out simultaneously and easily in the concentration range wherein the polymer is dissolved in the solvent uniformly, and generally it is preferred to 5 to 25 (g/dl). Also, the solvent can be removed by drying under reduced pressure at a temperature of 100° C. or higher while carrying out dispersion and grinding simultaneously in a mixer.

The polymer-coated magnetic powder obtained by this method is subjected to compression molding without removing the solvent to carry out desolvation (solvent removal) simultaneously with compression molding. Also, when desolvation is effected before molding, after adding a bad solvent so as to become a slurry containing 30 to 50% by weight of the magnetic powder, the solvent can be removed with the bad solvent by using an instantaneous vacuum drying device.

(4) Method by Volatilization or Evaporation of the Solvent in a Gel

A gel (solid component) previously prepared from a polymer solution and magnetic powder are dispersed and mixed, and then removal of the solvent was carried out while effecting dispersion and grinding, whereby adhering to or coating on the magnetic powder can be carried out.

That is, the gel obtained by cooling the resin solution from its dissolution temperature to room temperature was dispersed and mixed with the magnetic powder, and then, subjected to dispersion and grinding thereof, and thereafter drying under reduced pressure at a temperature of 100° C. or higher is performed to adhere or coat the gel to the magnetic powder can.

As the mixer, a Henshel mixer in method (3) can be used. Also, in order to improve grinding ability, balls may be used in combination. The size, hardness or numbers of balls may be optionally determined depending on grinding ability.

The concentration of the polymer solution is preferably 5 to 25 g/dl. If it is less than 5 g/dl, an amount of the solvent to be used increases so that productivity decreases, while if it exceeds 25 g/dl, dispersion of a gel is likely to becomes ununiform.

Regarding the magnetic powder coated or adhered with the polymer obtained by the above methods (1) to (4), grinding treatment is carried out, if necessary. For this grinding treatment, it is preferred to use an impact type mill and more specifically, a hammer mill (for example, a sample mill produced by Fuji Powdal K.K., or, an atomizer) may be applied. This is to supply a polymer-coated magnetic powder from a hopper via a feeder to a hammer-shaped rotary wing rotating with high speed (6000 to 12,000 rpm) to collide with the hammer, whereby the grinding treatment is carried out.

This grinding is generally carried out at a normal temperature and normal pressure, but it may be carried out at a low temperature by using a coolant such as dry ice, etc. or a liquid nitrogen atmosphere. Also, in case of using a rare earth magnetic powder, in order to avoid oxidation due to collision, it is preferred to effect the procedure at a low temperature under an inert gas atmosphere such as liquid nitrogen, etc. The shearing force to be applied may be optionally selected depending on the numbers of rotation and numbers of grinding treatments.

For preparing the resin-bonded type magnet of the present invention, the aforesaid magnet composition or the magnet material may be molded. For methods of molding, the injection molding method, the compression molding method, the extrusion molding method, the roll pressure method, etc., may be used. For example, when the injection molding method is used, the polymer having the repeating unit of the above formula (I) is preferable one having a limiting viscosity $[\eta]$ of 0.4 to 2.0 dl/g. If the limiting viscosity $[\eta]$ is less than 0.4 dl/g, magnetic characteristics are remarkably reduced since the magnetic powder is compressed at injection molding, while if it exceeds 2.0 dl/g, the molding property is inferior since the fluidity thereof is high. Also, when the compression molding is used, the limiting viscosity $[\eta]$ is preferably 0.4 dl/g or more. If it is less than 0.4 dl/g, the problem exists in that film forming property is inferior when coating the surface of the magnetic powder.

Specific methods for molding are as follows:

Firstly, when the magnet is prepared by the injection molding method, magnetic powder which is surface treated with a coupling agent, if necessary, as mentioned above, is kneaded with the polymer having the repeating unit of the above formula (I) to obtain a mixture. Kneading at this time should be performed to disperse the magnetic powder well at a temperature in the range between the melting point of the polymer and a temperature lower than the decomposition temperature thereof so as to avoid decomposition of the polymer, i.e. 360° to 540° C. in PEN-B, 360° to 530° C. in PEN-H, 340° to 520° C. in PEN-R and 370° to 510° C. in PEN-B, respectively.

The mixture obtained by kneading is further subjected to injection molding with a mold, and the temperature at this time is preferably the same as the temperature range at kneading and the pressure is preferably within the range of 1000 to 2000 kg/cm$^2$. The reason for determining the temperature range is the same as for kneading, and the reason for setting the pressure in the above mentioned range is to maintain good molding workability. More specifically, if the pressure is less than 1000 kg/cm$^2$, flow of the mixture becomes poor and it is difficult to obtain molded products excellent in dimensional accuracy, while if it exceeds 2000 kg/cm$^2$, crack, etc. are likely to result in the molded product.

If the injection molding is performed while applying a magnetic field of 10 kOe or more, an anisotropic resin magnet in which the magnetic powder is oriented to a predetermined direction can be produced. Also, by carrying out the procedure without applying a magnetic field, an isotropic resin magnet capable of magnetizing to all directions can be produced.

The thus prepared magnet (resin magnet) can be maintained in its magnetic characteristics and mechanical strength to the same degree as the conventional products and it is extremely improved in heat resistance, as compared with the conventional products.

When the magnet is prepared by the compression molding method, for combination of the polymer which becomes a binder with the magnetic powder, the method in which fine particles of the polymer and the magnetic powder are mixed, or the method in which the polymer is coated or adhered to the surface of the magnetic powder, etc. can be used. In this case, the amount of the polymer is preferably 2 to 5% by volume (0.5 to 4% by weight) in order to improve magnetic characteristics and to retain mechanical strength at an extent. For this, the method of coating with the polymer is preferred, and the specific contents are as mentioned above.

The compression molding is carried out after the above magnetic powder material is, if necessary, ground. Also, of compression molding methods, the cold compression molding is preferred. To conduct the cold compression molding, the molding pressure may be a pressure at which the above polymer as a binder resin causes plastic deformation or greater, and generally it may optionally be selected in the range of 1 t/cm$^2$ or greater. Also, for the temperature, room temperature is generally sufficient. According to cold compression molding, the binder resin is compressed by plastic deformation, whereby strength of the resulting molded product is increased and a resin (polymer)-bonded type magnet having excellent physical properties can be obtained.

Also, in conducting this cold compression, an anisotropic polymer-bonded type magnet can be obtained by carrying out the procedure while applying a magnetic field. In this case, it is effective to apply a magnetic field of 15 kOe or more. Also, if the cold compression molding is conducted without applying a magnetic field, an isotropic resin-bonded type magnet which is capable of magnetizing to all directions can be obtained.

After compression molding, if necessary, heat treatment may be carried out. This heat treatment may be carried out by allowing the magnet to stand at a temperature not less than the softening (pour) point or the melting point of the polymer for several minutes. According to this heat treatment, the polymer is fused and crystallized whereby recombination is progressed and the strength of the polymerbonded type magnet can further be improved.

Further, magnetization after molding is carried out by the conventional method such as applying a magnetic field of 20 koe or more.

In the method for preparing the polymer-bonded type magnet according to the present invention, a magnetic powder material to which a polymer is coated or adhered the other methods may be used, and the magnetic powder material obtained by the method for preparing the magnetic powder material of the present invention may be molded to a magnet obtained by the other methods, but by combining both methods of the present invention, production stability and mass productivity can be improved, whereby magnets having excellent characteristics can easily be obtained.

As explained above, the magnetic composition and the magnetic powder material of the present invention are good in preservability as compared with the case where a thermosetting polymer is used as a binder, since its chemical stability over a lapse of time is excellent.

Also, the resin-bonded type magnet of the present invention is a very practical endurable magnet which is excellent in heat resistance as well as excellent in chemical resistance, water absorption resistance, dimensional stability over a lapse of time, dimensional stability at molding, liner expansion coefficient, etc.

And yet, according to the method of the present invention, a magnet can be molded by the injection molding or the compression molding, and further by the cold compression molding without heating, so that the production steps are simple and inexpensive in costs such as equipment and working, and also excellent in production stability and mass productivity.

Accordingly, the resin-bonded type magnet in the present invention can be widely and effectively utilized for various electric and electronic devices including motors, etc. used in piaces with high temperature circumstances or requiring chemical resistance.

Also, according to the method for preparing the magnetic powder material of the present invention, a magnetic powder material suitable with the above method for preparing the resin-bonded type magnet can be effectively prepared.

Next, the present invention will be described in more detailed by referring to Examples.

(1) Magnetic Powder

Ferrite powder

Strontium ferrite; $SrO.6Fe_2O_3$
OP-71 produced by Nippon Bengara Industry K.K. (a product surface treated with a silane coupling agent)
Rare earth cobalt powder
Samarium cobalt 2-17 series; $Sm_2CO_{17}$
R-30 produced by Shinetsu Chemical Industries, Ltd. (32 mesh under):

Into a bortex pulverizer, 3 kg of magnetic powder and 5 liters of isopropanol were introduced, and after replacing the atmosphere with $N_2$ gas therein sufficiently, pulverization was carried out for 7 minutes and classified to obtain a powder having an average particle size of 37 μm. The resulting magnetic powder (3 kg) was introduced into a supermixer and the temperature was raised to 100° C. under a $N_2$ gas atmosphere, and 300 g of an isopropanol solution containing 10% of a silane coupling agent (A-1120 produced by Nippon Unicar K.K. (N-β-aminoethyl-γ-amino-propyl-trimethoxysilane)) was added dropwise over 5 minutes. Thereafter, stirring was continued for 10 minutes, subsequently desolvation (solvent removal) was carried out by blowing nitrogen gas. Then, the mixture was maintained in an oven at 100° C. for one hour.

Neodium series magnetic powder
(Rare earth-iron-boron powder): $Nd_2Fe_{14}B$
MQ-II powder produced by General Motors Co., Ltd.

Into a ball mill was introduced 3 kg of magnetic powder, and while stirring, 500 g of a toluene solution containing 3% by weight of titanate coupling agent (KRTTS: isopropyltriisostearoyltitanate produced by Ajinomoto K.K.) was added dropwise and the mixture was treated for 6 hours. Under a 80° C. bath, the mixture was dried by using an aspirator, and further vacuum dried at 60° C. and classified to obtain powder having an average particie size of 37 μm.

(2) Polymer (binder)

| Kinds | ① For injection molding | |
| | Limiting viscosity (dl/g) | Drying conditions |
| --- | --- | --- |
| PEN-R | 0.7 | 130° C., 6 hours ormore |
| PEN-N | 0.5 | |
| PEN-H | 1.0 | |
| PEN-8 | 0.9 | |

For comparative example:
PPS (Polyphenylene sulfide) commercially available product

| (1) For compression moldings | |
|---|---|
| Kinds | Limiting viscosity (dl/g) |
| PEN-R | 1.2 |
| PEN-N | 0.8 |
| PEN-H | 1.5 |
| PEN-B | 1.8 |

For comparative example:
Epoxy resin: Mixture of Epirets SU-8 (produced by Celaneese Co., Ltd.) (R) and 1-(2-hydroxy-propyl)-2-methylimidazole (C) (C/R ratio=0.04).

(3) Stirring Disperser

Ultradisperser produced by IKA Co., Ltd. (rotary number: 10000 rotations per minute).

(4) Instantaneous Vacuum Drying Device

Cracks system produced by Orient Chemical Industry Co., Ltd.

(5) Disperser (High Speed Mixer)

LFG-GS-1 Type (agitator rotary number; 2000 rotations per minute) produced by Shinko Industry Co., Ltd. Measurement of polymer-coated amount in Examples Into a flask was charged 10 g (the value precisely measured is $W_1$) of the magnetic powder after polymer coating, and dissolution and extraction under heating were carried out at 60° C. by using 150 ml of p-chlorophenol solvent. After repeating the above procedure by causing no nebula when water was added to the extracted filtrate, the solvent remaining in the magnetic powder was removed by methanol and then the powder was vacuum dried at 50° C. A weight ($W_2$) of the resulting magnetic powder removed the coated polymer was measured and a decreased weight was made as the amount of the coated polymer. The amount of the coated polymer by weight) was calculated from the following equation.

$$\text{Coated polymer amount (\% by weight)} = \frac{W_1 - W_2}{W_1} \times 100$$

EXAMPLE 1

In this example, a magnet was prepared by the injection molding method using the starting material and conditions as shown in Table 1.

After mixing magnetic powder and binder powder, the mixture was kneaded by using a continuous extrusion kneading machine (produced by K.K. KCK), formulated into pellets and injection molded.

By using a magnetic field injection molding machine TL50-MGS produced by Tanabe Industry K.K., molding was carried out in magnetic field of 10 kOe to obtain test pieces of a cylinder having a diameter of 20 mm and a thickness of 10 mm and a square pillar shape of 127 mm × 12 mm × 6 mm.

Regarding these test pieces, the following tests were carried out and the results were shown in Table 1.
Thermal deformation temperature: according to ASTM-D648. Load 18.6 kg/cm$^2$
Bending strength: according to ASTM-D790.
Water absorbing ratio: according to ASTM-D570.
Chemical resistance: according to JIS-K7114.

COMPARATIVE EXAMPLE 1

A magnet was prepared by the injection molding method in the same manner as in Example 1 with the starting materials and conditions as shown in Table 1. Resulting test pieces were examined in the same manner as in Example 1. The results are shown in Table 2.

TABLE 1

| No. | Magnetic powder | Polymer Kinds | Polymer Volume (Weight) (%) | Kneading temperature (°C.) | Injection molding conditions Temperature (°C.) | Injection molding conditions Pressure (kg/cm$^2$) |
|---|---|---|---|---|---|---|
| Experimental 1 | SrO.6Fe$_2$O$_3$ | PEN-H | 30 (10.5) | 365 | 375 | 1800 |
| Experimental 2 | " | " | 35 (12.7) | 365 | 375 | 1700 |
| Experimental 3 | " | " | 40 (14.9) | 360 | 370 | 1600 |
| Experimental 4 | " | " | 45 (17.1) | 360 | 365 | 1600 |
| Experimental 5 | " | PEN-R | 30 (10.5) | 355 | 365 | 1700 |
| Experimental 6 | " | " | 35 (12.7) | 355 | 365 | 1600 |
| Experimental 7 | " | " | 40 (14.9) | 350 | 360 | 1500 |
| Experimental 8 | " | " | 45 (17.1) | 350 | 360 | 1500 |
| Experimental 9 | " | PEN-N | 35 (12.7) | 370 | 385 | 1900 |
| Experimental 10 | " | PEN-B | 35 (12.7) | 370 | 380 | 1900 |
| Experimental 11 | Sm$_2$Co$_{17}$ | PEN-R | 25 (5.3) | 355 | 365 | 1900 |
| Experimental 12 | " | " | 30 (7.5) | 350 | 365 | 1800 |
| Experimental 13 | " | PEN-H | 25 (5.3) | 365 | 375 | 1800 |
| Experimental 14 | " | " | 30 (7.5) | 360 | 370 | 1700 |
| Experimental 15 | Nd$_2$Fe$_{14}$B | PEN-R | 25 (5.9) | 355 | 365 | 1800 |
| Experimental 16 | " | " | 30 (6.7) | 355 | 365 | 1800 |

| | Characteristics of molded materials | | | | Magnetic characteristics | | |
|---|---|---|---|---|---|---|---|
| No. | Thermal deformation temperature (°C.) | Beiding strength (kg/cm$^2$) | Water absorbing ratio (%) | Chemical resistance | Residual magnetic flux density Br (KG) | Coercive force bHc (KOe) | Maximum energy product $(BH)_{max}(MGOe)$ |
| Experimental 1 | 315 | 1200 | 0.010 | Good* | 2.75 | 2.25 | 1.83 |
| Experimental 2 | 310 | 1140 | 0.012 | Good* | 2.50 | 2.23 | 1.61 |
| Experimental 3 | 307 | 1100 | 0.014 | Good* | 2.35 | 2.20 | 1.35 |
| Experimental 4 | 302 | 1060 | 0.013 | Good* | 2.14 | 2.00 | 1.18 |
| Experimental 5 | 318 | 1300 | $9 \times 10^{-3}$ | Good* | 2.70 | 2.37 | 1.75 |
| Experimental 6 | 312 | 1270 | 0.010 | Good* | 2.43 | 2.22 | 1.52 |
| Experimental 7 | 307 | 1200 | 0.012 | Good* | 2.20 | 2.03 | 1.26 |

TABLE 1-continued

| | | | | | | | |
|---|---|---|---|---|---|---|---|
| Experimental 8 | 304 | 1140 | 0.013 | Good* | 2.10 | 1.98 | 1.06 |
| Experimental 9 | 318 | 950 | 0.015 | Good* | 2.38 | 2.21 | 1.44 |
| Experimental 10 | 325 | 1000 | 0.012 | Good* | 2.50 | 2.23 | 1.62 |
| Experimental 11 | 315 | 1350 | $7 \times 10^{-3}$ | Good* | 6.9 | 5.0 | 9.5 |
| Experimental 12 | 310 | 1300 | $9 \times 10^{-3}$ | Good* | 6.5 | 4.7 | 9.2 |
| Experimental 13 | 322 | 1280 | $8 \times 10^{-3}$ | Good* | 6.7 | 4.9 | 9.4 |
| Experimental 14 | 314 | 1210 | 0.010 | Good* | 6.4 | 4.5 | 9.0 |
| Experimental 15 | 325 | 1100 | $7 \times 10^{-3}$ | Good* | 5.2 | 4.7 | 6.0 |
| Experimental 16 | 320 | 1030 | $9 \times 10^{-3}$ | Good* | 5.2 | 4.0 | 5.3 |

*Not corroded by organic solvents, acids and alkaline solution other than p-chlorophenol and concentrated sulfuric acid.

TABLE 2

| No. | Magnetic powder | Polymer Kinds | Polymer Volume (Weight) (%) | Kneading temperature (°C.) | Injection molding conditions Temperature (°C.) | Injection molding conditions Pressure (kg/cm²) |
|---|---|---|---|---|---|---|
| Experimental 1 | SrO.6Fe$_2$O$_3$ | PPS | 35 (12.7) | 350 | 350 | 1400 |
| Experimental 2 | Sm$_2$Co$_{17}$ | " | 30 (7.5) | 360 | 360 | 1500 |
| Experimental 3 | Nd$_2$Fe$_{14}$B | " | 30 (6.7) | 360 | 355 | 1600 |

| No. | Characteristics of molded materials Thermal deformation temperature (°C.) | Beiding strength (kg/cm²) | Water absorbing ratio (%) | Chemical resistance | Magnetic characteristics Residual magnetic flux density Br (KG) | Coercive force bHc (KOe) | Maximum energy product $(BH)_{max}(MGOe)$ |
|---|---|---|---|---|---|---|---|
| Experimental 1 | 245 | 850 | 0.010 | Good* | 2.50 | 2.23 | 1.60 |
| Experimental 2 | 272 | 900 | $9 \times 10^{-3}$ | Good* | 7.0 | 5.1 | 9.7 |
| Experimental 3 | 286 | 800 | $9 \times 10^{-3}$ | Good* | 5.2 | 4.3 | 5.6 |

*Not corroded by organic solvents, acids and alkaline solution other than p-chlorophenol and concentrated sulfuric acid.

EXAMPLE 2

In this example, a magnet was prepared by compression molding using the starting materials and conditions as shown in Table 3.

Magnetic powder, a binder (polymer) and N-methylpyrrolidone as a solvent were mixed, and under an argon atmosphere, and the mixture was dissolved by heating to 190° C. Then, the mixture was gradually cooled to 50° C. over 4 hours while stirring, whereby precipitating the binder resin onto the surface of the magnetic powder to coat thereon. After washing the residual solvent, it was dried. However, when strontium ferrite powder was used, after coating with a resin, the powder was ground with a grinding machine.

Then, by using a magnetic field compression molding device (produced by High Tech Co., Ltd.), molding was effected at room temperature in a magnetic field of 15 kOe to obtain a square pillar sample having an approximate dimension of $8 \times 14 \times 7$ mm and a cylinder sample having a diameter of 20 mm and 10 g/each.

The resulting samples were subjected to heat treatment in an oven with an argon atmosphere for about 3 minutes, and then magnetization was carried out in a magnetic field of 20 kOe to obtain permanent magnets.

With respect to the resulting magnets, the same experiments as in Example 1 were carried out. The results are shown in Table 3. Measurement of compression strength (JIS-K 7208) was carried out in place of bending strength.

COMPARATIVE EXAMPLE 2

An epoxy resin, magnetic powder and acetone were mixed at room temperature, and after impregnation, desolvation (solvent removal) was carried out under reduced pressure. The obtained magnetic powder was subjected to compression molding in a magnet field as in Example 2, and then curing treatment was carried out at 100° C. for 2 hours under an argon atmosphere. This was magnetized in the same manner as in Example 2 to obtain permanent magnets.

Regarding the resulting magnets, the same experiments as in Example 2 were carried out. The results are shown in Table 3.

TABLE 3

| No. | No. | Magnetic powder | Polymer Kinds | Polymer Volume (Weight) | Coating conditions Amount of resin (g) | Coating conditions Amount of magnetic powder (g) | Coating conditions Amount of solvent (ml) | Heating (°C.) | Molding conditions Molding pressure (t/cm²) | Molding conditions Heat treatment temperature (°C.) |
|---|---|---|---|---|---|---|---|---|---|---|
| Example 2 | Experimental 1 | SrO.6Fe$_2$O$_3$ | PEN-H | 7 (2.10) | 1.9 | 98.1 | 190 | 190 | 4 | 360 |
| " | Experimental 2 | " | PEN-R | 7 (2.10) | 1.9 | 98.1 | 190 | 190 | 4 | 350 |
| " | Experimental 3 | " | PEN-B | 7 (2.10) | 1.8 | 98.2 | 180 | 190 | 4 | 360 |
| " | Experimental 4 | " | PEN-N | 7 (2.10) | 1.8 | 98.2 | 180 | 190 | 4 | 370 |
| " | Experimental 5 | " | PEN-R | 5 (1.34) | 1.4 | 98.6 | 145 | 190 | 4 | 350 |
| " | Experimental 6 | " | PEN-R | 10 (2.98) | 3.0 | 97.0 | 300 | 190 | 4 | 350 |
| " | Experimental 7 | " | PEN-R | 7 (2.10) | 1.9 | 98.1 | 190 | 190 | 5 | 350 |
| " | Experimental 8 | " | PEN-R | 7 (2.10) | 1.9 | 98.1 | 190 | 190 | 6 | 350 |
| " | Experimental 9 | Sm$_2$Co$_{17}$ | PEN-R | 5 (0.93) | 0.85 | 99.15 | 85 | 190 | 4 | 350 |
| " | Experimental 10 | " | PEN-H | 7 (1.18) | 1.27 | 98.73 | 120 | 190 | 4 | 360 |
| " | Experimental 11 | Nd$_2$Fe$_{14}$B | PEN-R | 7 (1.34) | 1.27 | 98.73 | 130 | 190 | 4 | 350 |

TABLE 3-continued

| | | | | | | | | | | |
|---|---|---|---|---|---|---|---|---|---|---|
| " | Experimental 12 | " | PEN-H | 7 (1.34) | 1.27 | 98.73 | 130 | 190 | 4 | 360 |
| " | Experimental 13 | " | PEN-B | 7 (1.34) | 1.8 | 98.2 | 180 | 190 | 4 | 360 |
| Comparative example 2 | Experimental 14 | $Sm_2Co_{17}$ | Epoxy resin | — | 2.0 | 98.0 | 50 | Room temperature | 4 | 150 |
| Comparative example 2 | Experimental 15 | $Nd_2Fe_{14}B$ | Epoxy resin | — | 2.0 | 98.0 | 50 | Room temperature | 4 | " |

| | | Characteristics of molded material | | | Magnetic characteristics | | | |
|---|---|---|---|---|---|---|---|---|
| No. | No. | Thermal deformation temperature (°C.) | Compression strength (kg/cm$^2$) | Water-absorbing ratio ($10^{-3}$ %) | Residual magnetic flux density Br (KG) | Coercive force bHc (KOe) | Maximum energy product $(BH)_{max}(MGOe)$ | Amount of resin coated (% by weight) |
| Example 2 | Experimental 1 | 340 | 1200 | 4.9 | 2.54 | 2.34 | 1.60 | 1.5 |
| " | Experimental 2 | 335 | 1390 | 4.8 | 2.57 | 2.35 | 1.62 | 1.5 |
| " | Experimental 3 | 353 | 1200 | 5.0 | 2.55 | 2.36 | 1.60 | 1.4 |
| " | Experimental 4 | 360 | 980 | 4.2 | 2.52 | 2.30 | 1.59 | 1.4 |
| " | Experimental 5 | 337 | 1250 | 3.5 | 2.67 | 2.30 | 1.71 | 1.1 |
| " | Experimental 6 | 333 | 1620 | 7.0 | 2.36 | 2.11 | 1.39 | 2.2 |
| " | Experimental 7 | 337 | 1460 | 4.9 | 2.62 | 2.30 | 1.68 | 1.5 |
| " | Experimental 8 | 339 | 1520 | 5.0 | 2.69 | 2.32 | 1.63 | 1.5 |
| " | Experimental 9 | 337 | 1200 | 3.4 | 8.0 | 6.2 | 14.3 | 0.7 |
| " | Experimental 10 | 339 | 1320 | 4.7 | 7.6 | 6.43 | 13.0 | 1.0 |
| " | Experimental 11 | 334 | 960 | 4.8 | 5.4 | 4.8 | 7.3 | 1.0 |
| " | Experimental 12 | 342 | 890 | 4.8 | 5.6 | 4.9 | 7.8 | 1.0 |
| " | Experimental 13 | 352 | 950 | 4.9 | 6.1 | 5.3 | 8.0 | 1.3 |
| Comparative example 2 | Experimental 14 | 200 | 460 | 8.2 | 6.6 | 8.0 | 14.7 | — |
| Comparative example 2 | Experimental 15 | 205 | 380 | 8.0 | 6.1 | 5.3 | 8.0 | — | a. Coating Step

EXAMPLE 3

Into a glass apparatus supplied therein 975 g of ferrite powder preheated to 200° C. and equipped with a 5 liter jacket was poured at 190° C. 2 liters of N-methylpyrrolidone polymer solution dissolved therein 25 g of a polymer (PEN-R, limiting viscosity 0.70 (dl/g), produced by Idemitsu Kosan Co., Ltd.), and then the mixture was cooled to room temperature by flowing cold water in the jacket while vigorously stirring and dispersing with a stirring disperser.

Thereafter, stirring and dispersing were carried out while adding dropwise 600 ml of isopropyl alcohol from a dropping funnel over 30 minutes. The resulting slurry was subjected to solvent replacement due to decantation using one liter of isopropyl alcohol and repeated three times, and then the solvent was removed by an instantaneous vacuum drying device. Working conditions of the instantaneous vacuum drying device were a heating pipe jacket temperature of 130° C., a temperature in the powder collecting room of 120° C., vacuum degree of 30 torr, a liquid transferring pump of 250 cc/min and a discharging pressure of 0.1 to 2.7 kg/cm$^2$.

EXAMPLE 4

In Example 3, the polymer was changed from PEN-R to PEN-H (limiting viscosity 0.4 (dl/g), produced by Idemitsu Kosan Co., Ltd.), and polymer coating was carried out in the same manner as in Example 3.

EXAMPLE 5

In Example 3, the polymer was changed from PEN-R to PENN (limiting viscosity 0.3 (dl/g), produced by Idemitsu Kosan Co., Ltd.), and polymer coating was carried out in the same manner as in Example 3.

EXAMPLE 6

In Example 3, the polymer was changed from PEN-R to PEN-B (limiting viscosity 0.5 (dl/g), produced by Idemitsu Kosan Co., Ltd.), and polymer coating was carried out in the same manner as in Example 3.

EXAMPLE 7

In Example 3, the magnetic powder was replaced with neodium series magnetic powder, and polymer coating was carried out in the same manner as in Example 3 under an inert atmosphere of argon stream.

EXAMPLE 8

In Example 3, the magnetic powder was replaced with samarium cobalt series magnetic powder, and polymer coating was carried out in the same manner as in Example 3 under an inert atmosphere of argon stream.

EXAMPLE 9

Into 2 liters of N-methyl-2-pyrrolidone was dissolved 18 g of PENN (limiting viscosity 0.3 (dl/g), produced by Idemitsu Kosan Co., Ltd.) at 195° C., and 982 g of ferrite magnetic powder and 4 liters of tolune were mixed, and while strongly stirring and dispersing with a stirring disperser, the mixture was supplied to an instantaneous vacuum drying apparatus through a transfer pump to effect direct solvent removal. Working conditions of the instantaneous vacuum drying apparatus were a heating pipe jacket temperature of 160° C., a temperature in a powder collecting room of 160° C., vacuum degree of 30 torr, a liquid transferring pump of 250 cc/min and a discharging pressure of 0.1 to 2.5 kg/cm$^2$.

EXAMPLE 10

In Example 9, the polymer was ckanged from PEN-R to PEN-H (limiting viscosity 0.4 (dl/g), and produced by Idemitsu Kosan Co., Ltd.), polymer coating was carried out in the same manner as in Example 9.

EXAMPLE 11

In Example 9, the polymer was changed from PEN-R to PEN-N (limiting viscosity 0.3 (dl/g), produced by Idemitsu Kosan Co., Ltd.), and polymer coating was carried out in the same manner as in Example 9.

EXAMPLE 12

In Example 9, the polymer was changed from PEN-R to PEN-B (limiting viscosity 0.5 (dl/g), produced by Idemitsu Kosan Co., Ltd.), and polymer coating was carried out in the same manner as in Example 9.

EXAMPLE 13

In Example 9, the magnetic powder was replaced with neodium series magnetic powder and the discharging pressure was changed to 0.1 to 1.8 kg/cm$^2$, and polymer coating was carried out in the same manner as in Example 9.

EXAMPLE 14

In Example 9, the magnetic powder was replaced with samarium cobalt series magnetic powder and the discharging pressure was changed to 0.1 to 1.8 kg/cm$^2$, and polymer coating was carried out in the same manner as in Example 9.

EXAMPLE 15

In Example 9, the polymer was replaced with PEN-H (limiting viscosity 0.4 (dl/g), produced by Idemitsu Kosan Co., Ltd.), the magnetic powder was replaced with neodium series magnetic powder and the discharging pressure was changed to 0.1 to 1.3 kg/cm$^2$, and polymer coating was carried out in the same manner as in Example 9 under an inert atmosphere of argon stream.

EXAMPLE 16

In Example 9, the polymer was replaced with PENN (limitind viscosity 0.3 (dl/g), produced by Idemistu Kosan Co., Ltd.), the magnetic powder was replaced with neodium series magnetic powder and the discharging pressure was changed to 0.1 to 1.8 kg/cm$^2$, and polymer coating was carried out in the same manner as in Example 9 under an inert atmosphere of argon stream.

EXAMPLE 17

In Example 9, the polymer was replaced with PEN-B (limiting viscosity 0.5 (dl/g), produced by Idemistu Kosan Co., Ltd.), the magnetic powder was replaced with neodium series magnetic powder and the discharging pressure was changed to 0.1 to 1.8 kg/cm$^2$, and polymer coating was carried out in the same manner as in Example 9 under an inert atmosphere of argon stream.

EXAMPLE 18

Into 200 ml of N-methyl-2-pyrrolidone was dissolved 18 g of PEN-R (limiting viscosity 0.6 (dl/g), produced by Idemitsu Kosan Co., Ltd.) at 200° C., and the solution was added dropwise over 5 minutes into an apparatus supplied therein 982 g of ferrited powder preheated to 190° C. under high speed dispersion and stirring. Then while the mixture was cooling to room temperature by flowing water in the jacket, it was dispersed, mixed and stirred by setting an agitator to 1500 rpm. At the same time, solvent removal was also carried out at 130° C. and by coexisting balls to effect grinding, whereby polymer coated magnetic powder was prepared. A hundred balls made of alumina and having a diameter of 10 mm were used.

EXAMPLE 19

In Exampie 18, the polymer was changed from PEN-R to PEN-H (limiting viscosity 0.4 (dl/g), produced by Idemitsu Kosan Co., Ltd.), and polymer coating was carried out in the same manner as in Example 18.

EXAMPLE 20

In Example 18, the polymer was changed from PEN-R to PEN-N (limiting viscosity 0.3 (dl/g), produced by Idemitsu Kosan Co., Ltd.), and polymer coating was carried out in the same manner as in Example 18.

EXAMPLE 21

In Example 18, the polymer was changed from PEN-R to PEN-B (limiting viscosity 0.5 (dl/g), produced by Idemitsu Kosan Co., Ltd.), and polymer coating was carried out in the same manner as in Example 18.

EXAMPLE 22

In Example 18, the magnetic powder was replaced with neodium series magnetic powder, and polymer coating was carried out in the same manner as in Example 18.

EXAMPLE 23

In Example 18, the magnetic powder was replaced with samarium cobalt series magnetic powder, and polymer coating was carried out in the same manner as in Example 18.

EXAMPLES 24 to 32

Into 120 ml of N-methylpyrrolidone as a solvent was dissolved 18 g of the following resins by heating to 200° C. under stirring to obtain a hot solution. 15 g/dl of this hot solution was cooled to room temperature to prepare a solid material (gel).

Next, 982 g of the following magnetic powders and the previously prepared gel (15 g/dl) containing a solvent were supplied in a disperser and dispersing and mixing were carried out with an agitator at 1000 rpm. Thereafter, while carrying out vacuum drying at 30° C., grinding with an agitator at 1500 rpm (in the copresence of 100 balls made of alumina having a diameter of 10 mm) and simultaneously with solvent removal were carried out to prepare resin coated magnetic powder. Provided that when a rare earth series magnetic powder was used, supplying was effected under inert atmosphere.

| | Kinds of magnetic powder and a resin |
|---|---|
| Example 24 | Ferrite magnetic powder and PEN-R gel (limiting viscosity of PEN-R 0.6 (dl/g)) |
| Example 25 | Ferrite magnetic powder and PEN-N gel (limiting viscosity of PEN-N 0.3 (dl/g)) |
| Example 26 | Ferrite magnetic powder and PEN-H gel (limiting viscosity of PEN-H 0.4 (dl/g)) |
| Example 27 | Ferrite magnetic powder and PEN-B gel (limiting viscosity of PEN-B 0.5 (dl/g)) |

-continued

| Kinds of magnetic powder and a resin |
| --- |
| Example 28 Neodium series magnetic powder and PEN-R gel (limiting viscosity of PEN-R 0.6 (dl/g)) |
| Example 29 Neodium series magnetic powder and PEN-H gel (limiting viscosity of PEN-H 0.4 (dl/g)) |
| Example 30 Neodium series magnetic powder and PEN-B gel (limiting viscosity of PEN-B 0.5 (dl/g)) |
| Example 31 Samarium cobalt series magnetic powder and PEN-R gel (limiting viscosity of PEN-R 0.6 (dl/g)) |
| Example 32 Samarium cobalt series magnetic powder and PEN-H gel (limiting viscosity of PEN-H 0.4 (dl/g)) | b. Grinding step

The ferrite magnetic resin-coated powder obtained in the above Examples 3 to 6, and 9 to 12 were effected grinding twice by using a grinding machine (produced by Fuji Powdal K.K., Sample mill) at 10000 rpm, respectively, and the rare earth series magnetic resin-coated powder obtained in Examples 7, 9, and 13 to 17 were affected grinding once by useing the same machine and flowing a liquid nitrogen with copresence thereof at 6000 rpm, respectively.

c. Compression molding step

The anisotropic ferrite magnetic resin-coated powder of the above Examples 3 to 6, and 9 and 12 after grinding, and the anisotropic ferrite magnetic poiymer-coated powder obtained in Exampies 18 to 21, and 24 to 27 were subjected to compression molding at room temperature and an applied pressure of 3 ton/cm$^2$ in a magnetic field of 10 kOe.

The anisotropic samarium cobalt magnetic polymer-coated powder of the above Examples 8 and 14 after grinding, and the anisotropic samarium cobalt magnetic polymer-coated powder obtained in Examples 23, 31 and 32 were subjected to compression molding at room temperature and an applied pressure of 6 ton/cm$^2$ in a magnetic field of 15 kOe.

The isotropic neodium magnetic polymer-coated powder of the above Examples 7 and 13 after grinding, and the isotropic neodium magnetic polymer-coated powder obtained in Examples 22, and 28 to 30 were subjected to compression molding at room temperature and an applied pressure of 7 ton/CM$^2$ in a non-magnetic field.

A test piece for measuring thermal deformation temperature mentioned hereinafter was molded to a square pillar shape having 8×14×7 mm and a test piece for measuring bending strength was molded to a shape of 40×4×3 mm, respectively.

d. Thermal treatment

With respect to each magnet after the above compression moiding, it was exposed at 350° C. for 3 minutes and then at 260° C. for 5 minutes, however those using the polymer coated powder of the magnets in Examples 18 to 23 were previously dried at 150° C. for one hour under reduced pressure to remove the residual solvent in the molded material.

e. Magnetization

A magnetic field of 15 koe was applied to the anisotropic ferrite magnet, and 20 kOe was applied to the rare earth series.

Regarding each magnet thus prepared, various experiments were carried out and the results are shown in Table 4. The experimental conditions are as follows:
Bending strength: according to JIS-R1601.
Thermal deformation temperature: according to ASTM-D648. Load 18.6 kg/cm
Compression strength: according to JIS-K7208.

TABLE 4

|  | Thermal deformation temperature (°C.) | Water absorbing ratio ($10^{-3}$%) | Linear expansion coefficient (cm/cm °C.) × $10^{-6}$ | Bending strength (kg/cm$^2$) | Residual magnetic flux density Br(KG) | Specific coercive force iHc(kOe) | Maximum energy product $(BH)_{max}(MGOe)$ | Coated polymer amount (wt %) |
| --- | --- | --- | --- | --- | --- | --- | --- | --- |
| Example 3 | 330 | 5.0 | 3.6 | 700 | 2.54 | 2.27 | 1.45 | 2.2 |
| Example 4 | 340 | 4.8 | 3.5 | 650 | 2.55 | 2.28 | 1.47 | 2.1 |
| Example 5 | 355 | 5.3 | 3.5 | 600 | 2.53 | 2.29 | 1.49 | 2.0 |
| Example 6 | 345 | 4.6 | 3.4 | 600 | 2.52 | 2.30 | 1.46 | 2.2 |
| Example 7 | 332 | 4.8 | 3.6 | 750 | 6.10 | 8.22 | 8.10 | 1.7 |
| Example 8 | 335 | 4.7 | 3.8 | 800 | 8.50 | 10.60 | 16.70 | 1.8 |
| Example 9 | 335 | 4.8 | 3.3 | 650 | 2.48 | 2.30 | 1.47 | 1.7 |
| Example 10 | 342 | 4.7 | 3.4 | 620 | 2.50 | 2.35 | 1.49 | 1.8 |
| Example 11 | 357 | 5.2 | 3.1 | 610 | 2.55 | 2.27 | 1.49 | 1.8 |
| Example 12 | 360 | 4.5 | 3.5 | 610 | 2.56 | 2.32 | 1.52 | 1.7 |
| Example 13 | 332 | 4.6 | 3.7 | 720 | 6.20 | 8.25 | 8.30 | 1.7 |
| Example 14 | 333 | 4.5 | 3.5 | 750 | 8.52 | 10.80 | 16.85 | 1.7 |
| Example 15 | 335 | 4.8 | 3.8 | 730 | 6.25 | 8.30 | 8.32 | 1.7 |
| Example 16 | 358 | 4.6 | 3.6 | 740 | 6.30 | 8.27 | 8.30 | 1.7 |
| Example 17 | 353 | 4.5 | 3.5 | 760 | 6.20 | 8.25 | 8.28 | 1.7 |
| Example 18 | 330 | 5.1 | 3.7 | 740 | 2.74 | 2.57 | 1.55 | 1.5 |
| Example 19 | 330 | 4.9 | 3.6 | 690 | 2.75 | 2.58 | 1.60 | 1.8 |
| Example 20 | 355 | 5.2 | 3.6 | 640 | 2.73 | 2.59 | 1.59 | 1.8 |
| Example 21 | 353 | 4.5 | 3.5 | 650 | 2.72 | 2.50 | 1.62 | 1.8 |
| Example 22 | 330 | 4.6 | 3.7 | 790 | 6.40 | 8.42 | 8.80 | 1.7 |
| Example 23 | 332 | 4.8 | 3.9 | 830 | 8.80 | 11.35 | 17.30 | 1.7 |
| Example 24 | 330 | 4.9 | 3.5 | 680 | 2.54 | 2.27 | 1.45 | 1.7 |
| Example 25 | 355 | 4.7 | 3.4 | 630 | 2.55 | 2.28 | 1.47 | 1.8 |
| Example 26 | 340 | 5.2 | 3.3 | 580 | 2.53 | 2.29 | 1.49 | 1.7 |
| Example 27 | 354 | 4.5 | 3.4 | 560 | 2.52 | 2.30 | 1.46 | 1.7 |
| Example 28 | 328 | 4.7 | 3.5 | 720 | 6.10 | 8.22 | 8.10 | 1.7 |
| Example 29 | 342 | 4.7 | 3.6 | 710 | 6.25 | 8.30 | 8.32 | 1.6 |
| Example 30 | 355 | 4.5 | 3.7 | 690 | 6.20 | 8.25 | 8.30 | 1.7 |
| Example 31 | 333 | 4.6 | 3.6 | 740 | 8.50 | 10.60 | 16.70 | 1.8 |

TABLE 4-continued

| | Thermal deformation temperature (°C.) | Water absorbing ratio ($10^{-3}$%) | Linear expansion coefficient (cm/cm °C.) × $10^{-6}$ | Bending strength (kg/cm$^2$) | Residual magnetic flux density Br(KG) | Specific coercive force iHc(kOe) | Maximum energy product $(BH)_{max}(MGOe)$ | Coated polymer amount (wt %) |
|---|---|---|---|---|---|---|---|---|
| Example 32 | 341 | 4.4 | 3.1 | 730 | 8.52 | 10.80 | 16.85 | 1.8 |

Also, regarding the magnet wherein the PEN-R-coated magnetic powder obtained in the above Example 7 was subjected to the above grinding, compression molding in a non-magnetic field, heat treatment and magnetization treatment, chemical resistance, dimensional stability with a lapse of time and dimensional stability at molding were evaluated. The results of chemical resistance are shown in Table 5.

The chemical resistance was according to JIS-K7114 and visual inspection and measurements of changes in weight and dimension were carried out.

Also, regarding the dimensional stablity with a lapse of time (test piece: approximate dimention 8×14×7 mm, in outer air), a changed ratio of dimension (maximum value of dimensional ratio changed within one month) was 0.002%, and regarding the dimensional stability at molding, a changed ratio of dimension after heat treatment was 0.015%.

Here, the above changed ratio in dimension and the changed ratio in dimension after heat treatment are as follows:

$$\text{Changed ratio in dimension (\%)} = \frac{\text{Dimension at present} - \text{Standard dimension}}{\text{Standard dimension}} \times 100$$

(Standard dimension: Dimension immediately after heat treatment (room temperature))

Change ratio in dimension after heat treatment (%) =

$$\frac{\text{Dimension after heat treatment} - \text{Dimension before heat treatment}}{\text{Dimension before heat treatment}} \times 100$$

TABLE 5

| Chemicals | Chemical resistance | Chemicals | Chemical resistance |
|---|---|---|---|
| Hydrochloric acid (10%) | ⊚ | Toluene | ⊚ |
| Sulfuric acid (10 %) | ⊚ | Xylene | ⊚ |
| dil. Nitric acid (5%) | ⊚ | Methyl alcohol | ⊚ |
| conc. aqueous ammonia | ⊚ | Butyl alcohol | ⊚ |
| Saline (saturated) | ⊚ | Formalin | ⊚ |
| Potassium carbonate (saturated) | ⊚ | Acetone | ⊚ |
| Formic acid (10 %) | ⊚ | Methyl alcohol Ethyl acetate | ⊚ |
| Acetic acid | ⊚ | Diethyl ether | ⊚ |
| Pyridine | ⊚ | Trichloroethylene | ⊚ |
| Benzene | ⊚ | Cargon tetrachloride | ⊚ |

⊚: No change in weight and dimension.

In yet another embodiment of the present invention, a crystalline thermoplastic resin excellent in heat resistance is used as a resin (a binder resin) to be coated on or adhered to magnetic powder. Here, as the thermoplastic resin, various ones can be used, but generally those having a melting point of 200° C. or higher, preferably 230° C. or higher. Among them, those having at least one —S— bond or —O— bond in the chemical bond skeleton is particularly preferred. Specific examples of these resins include polyether ether ketone (PEEK), polyether ketone, polyphenylenesulfide (PPS), polysulfide ketone, etc.

Also, if the molecular weight of these resins is too large, there are problems in that pressure applied at molding mentioned thereinbelow becomes too large so that the resulting molded material sometimes reverts back or crushing thereof becomes difficult. Further, if the molecular weight thereof is too small, coating with resin becomes difficult. Accordingly, the molecular weight of the resin should optionally be selected in view of the above matters. For example, in case of PPS, a limiting viscosity thereof in achloronaphthalene solvent at 206° C. is 0.1 dl/g or higher, preferably 0.15 to 0.3 dl/g and in case of PEEK, a limiting viscosity thereof in p-chlorophenol solvent at 60° C. is 0.3 dl/g or higher, preferably 0.3 to 0.85 dl/g.

On the other hand, the type of the magnetic powder in this embodiment is not particularly limited and various ones can be optionally selected depending on the purposes. Specific examples thereof include ferrite powder such as $BaO.6Fe_2O_3$, $MnO.ZnO.Fe_2O_3$, $\gamma\gamma$-$Fe_3O_4$ $PbO.6Fe_2O_3$, $SrO.6Fe_2O_3$, etc.; arnico powder such as MCA160, MCA230, MCB500, MCB580, MCB4DOH, etc. of JIS standard; rare earth cobalt powder such as $SmCo_5$, $PrCo_5$, $NdCo_5$, $MMcO_5$ (here, MM represents a Misch metal), $SmPrCo_5$, $SmPrNdCo_5$, $smMMco_5$, $R_2Co_{17}$ (wherein R represents a series of rare earth elements of atomic numbers from 58 to 71), $Sm_2Co_{17}$, $Pr_2CO_{17}Sm_2$ $(Co, Fe, Cu)_{17}$ and $Sm_2(Co, Fe, Cu, M)_{17}$ (wherein M represents Ti, Zr or Hf). Further, there can be mentioned rare earth-iron-boron powder ($Nd_2Fe_{14}B$, $Nd_2Fe_{12}Co_2B$, $Pr_2Fe_{14}B$, etc.). In addition, there can be mentioned Fe-Cr-Co magnetic powder, Mn-Al-C magnetic powder, Pt-Co magnetic powder, Pt-Fe magnetic powder, cunife magnetic powder, etc.

In the present invention, the above magnetic powder can be used as it is by mixing with the above thermoplastic resin, but in order to prevent oxidation of the magnetic powder and improve adhesiveness into a binder (the themoplastic resin), it is preferred to surface treat them with a coupling agent in an amount of 5% by weight or less, particularly 0.5 to 2.0% by weight based on the magnetic powder.

Here, coupling agents which can be used include various ones but titanate series and silane series ones are preferable. The titanate series coupling agents include isopropyltriisostearoyl titanate, isopropyltrioctanoyl titanate, isopropyltris(dioctylpyrophosphate)titanate, isopropyldimethacrylisostearoyl titanate, isopropyl-tri(N-aminoethyl-aminoethyl) titanate, isopropyl-tridodecylbenzenesulfonyl titanate, isopropylisostearoyldiacryl titanate, isopropyltri(dioctylphosphate)-titanate, isopropyltricumylphenyl titanate, tetraisopropylbis(dioctylphosphite)titanate, tetraoctylbis(ditridecylphosphite)titanate, tetra(2,2-diallyloxymethyl-1-butyl)bis(ditridecyl)phosphite titanate, bis(dioctyl-pyrophosphate)oxyacetate titanate, bis(dioctylpyrophosphate)-ethylene titanate, etc. These may be used singly or in combination. Also, the silane series coupling agents include γ-mercapto-propyl-trimethoxysilane, 2-styryl-ethyltrimethoxysilane, N-β-(aminoethyl)γ-aminopropyl-trimethoxysilane, β-(3,4-epoxycyclohexyl)ethyltrimethoxysilane, γ-aminopropyl-trimethoxysilane, γ-glycidoxy-propyltrimethoxysilane, phenyltrimethoxysilane, methyldimethoxysilane, etc. and these may be used singly or in combination. Further, the titanium series coupling agents and the silane series coupling agent can be used in combination.

The surface treatment by the coupling agent can be carried out by wetting magnetic powder with 5 to 204 by volume of the coupling agent solution (using an alcohol or toluene as a solvent), and then drying it at a temperature not less than room temperature, preferably 120° to 150° C. According to the surface treatment due to the coupling agent, water repellent property and lubricity are applied to the magnetic powder so that the mechanical strength, etc. of the resin-bonded type magnet obtained after molding can be improved.

The magnetic powder material in the present invention can be obtained by coating or adhering the above crystalline thermoplastic resin with heat resistance onto the above magnetic powder with a ratio of 0.1 to 5% by weight, preferably 1 to 4% by weight. As the method for preparing the magnetic powder material by coating or adhering the thermoplastic resin on or to the magnetic powder, there may be mentioned the method in which said resin and magnetic powder are mixed in the temperature range between the crystal fusion initiating temperature and the melting point of the resin, and then the mixture is cooled to coat thereon or adhere thereto; by utilizing the crystallinity of the resin. However, this method requires high temperatures so that there is danger of causing deterioration of the magnetic powder due to oxidation, and sometimes it is difficult to uniformly disperse the magnetic powder and completely coat or adhere the resin thereon. Accordingly, as preferred methods for avoiding these problems, there can be mentioned (1) the method in which coating or adhering is effected by precipitating the resin from the solution system due to phase separation after dissolving the resin in a solvent, (2) the method in which coating or adhering is effected by precipitating the resin by volatilizing the solvent, or (3) the method in which adhering is effected by mechanically pressing resin fine particles, smaller than the magnetic powder particles, on the surface thereof, etc.

For preparing the magnetic powder material, the crystalline thermoplastic resin with excellent heat resistance is coated on or adhered to the magnetic powder by the method as mentioned above (1) or (2), and at this time, the amount of the resin to be coated or adhered is 0.1 to 5% by weight (ratio based on the total magnetic powder material) as already mentioned. If the coated or adhered amount is less than 0.1% by weight, the resin cannot act as the binder and the shape when molded cannot be retained. Also, if it exceeds 5% by weight, magnetic characteristics are decreased.

An amount of the coated resin can be calculated by dissolving the resin of the magnetic powder material to remove with p-chlorophenol or a-chloronaphthalene, etc., having strong dissolving power and measuring the weight decreased.

Next, as the solvent for dissolving the resin, it is preferred to use a polar solvent having high dissolving power, which can dissolve the above crystalline thermoplastic resin with heat resistance, and may include, for example, N-methylpyrrolidone, α-chloronaphthalene, dichloroacetic acid, 1,3-dimethyl-2-imidazolidinone, dimethylsulfoxide, dimethylacetamide, dimethylformamide, p-chlorophenol, etc.

The kind of the solvent to be used should be optionally selected depending on the kinds or molecular weights of the resin, and generally, it is preferred that α-chloronaphthalene is used when PPS is employed as the resin, and dichloroacetic acid or α-chloro-naphthalene is used when PEEK is used as the resin.

Also, an amount of the solvent may be varied depending on the amount of the resin supplied, or kinds, grain size distribution, wettability, adhesiveness to the resin of the magnetic powder, etc. For example, when an anisotropic one such as ferrite magnetic powder or samarium cobalt magnetic powder is coated with a resin, in order to decrease aggregation of the magnetic powder with each other, it is preferred to make the condition wherein a mixed slurry of the magnetic powder and the resin solution is diluted to about 5 to 50% by weight. Accordingly, a ratio of the amount of the resin to the solvent, i.e. a polymer concentration (amount of charged resin (g)/amount of solvent (dl)) is preferably 0.1 to 5 (g/dl).

Also, in order to dissolve the resin in a solvent, it is carried out by charging the above solvent and the resin in a powder state in a suitable stirring tank and then heating while stirring. The heating temperature at this time is to be raised, for example, to 190° C. or higher when N-methylpyrrolidone is used as the solvent, and to 250° C. or higher when α-chloronaphthalene is used. Heating and stirring are preferably continued to uniformly dissolve the resin.

For effecting the resin coating to the magnetic powder by using the thus prepared resin solution, it is carried out by four kinds of methods mentioned hereinbelow. the method employed for the resin coating can be optionally selected depending on kinds of resin solution or magnetic powder to be used or conditions thereof.

(1) Method of Using a Bad Solvent

By adding a bad solvent of the resin to a hot solution of the resin (a mixture wherein magnetic powder is dispersed in a solution dissolved the resin therein), the solubility thereof can be made lower so that the resin can be precipitated on the magnetic powder. The bad solvent means a solvent in which the resin is insoluble or little soluble.

The dropwise addition of the bad solvent is preferably started at temperatures wherein the hot solution of the resin is uniformly dissolved. That is, the temperature whereat almost all the resin in the solution does not start to precipitate upon cooling, and is preferably the temperature not more than the boiling point of the bad solvent.

As the bad solvent, an organic solvent other than α-chloronaphthalene (in the range of 205° to 250° C.) and water for PPS, an organic solvent other than dichloroacetic acid (150° C.) α-chloronaphthalene (205° to 250° C.) and p-chlorophenol (50° C.), and water for PEEK can be employed; so that it may be optionally selected depending on the molecular weight of the resin to be used, concentration of the resin and solubility of the resin depending on the dissolution temperature.

Specific examples of the bad solvents include water, methanol, isopropyl alcohol, acetone, toluene, etc. Also, solvent with high boiling point such as N-methylpyrrolidone, a-chloronaphthalene, 1,3-dimethyl-2-imidazolidinone, dimethylsulfoxide, dimethylacetamide, dimethylformamide, etc. may be used as the bad solvent depending on the temperature.

The added amount of the bad solvent depends on the concentraion of the resin solution, but generally an amount equivalent to the amount of the basic solvent or more is preferred. As to the method of addition, it is preferred to supply with liquid drops as minute as possible (for example, a liquid in the atomizing state) under vigorous dispersion and stirring.

(2) Method Due to Volatilizaiton and Evaporation

The method in which the solvent is volatilized and evaporated to precipitate the resin on the magnetic powder may be carried out, for example, by supplying with a liquid transferring pump, a mixed slurry (mixture) of the magnetic powder, the resin solution and a low boiling point solvent having high solubility to the resin to a heating tube overheated and explosively blowing out in a room with high temperature and vacuum, to evaporate (volatilize) the solvent in a moment.

However, in this case, when selection of a mixed solvent with a low boiling point solvent having high solubility to the resin is difficult, evaporation (volatilization) of the solvent in a moment can be carried out with a good solvent alone if temperatures of the heating tube and the room with high temperature and vacuum are not less than the boiling point of the solvent.

As an apparatus for carrying out such procedures, there may be applied the Cracks System (an instantaneous, vacuum drying apparatus) produced by orient chemical Industry Co., Ltd.

(3) The Method by Cooling

By cooling a hot solution of the resin (a mixed solution of magnetic powder dispersed in a solution of dissolved resin) and decreasing the solubility of the resin, the resin can be precipitated on the magnetic powder. Further, the low molecular weight component, which is a part of the solution and cannot be precipitated, can be precipitated by adding a bad solvent.

More specifically, it can be carried out by mixing the hot solution of the resin uniformly dissolved with magnetic powder in a stirring tank having a jacket, and cooling the mixture to room temperature while effecting dispersion and stirring with a wet dispersing and stirring apparatus and flowing cold water through the jacket.

Further, by adding a bad solvent with an amount equivalent to or more than the volume of the resin solution, almost all of the resin can be precipitated.

As the above wet dispersing and stirring apparatus, there may be applied, for example, an ultrahomomixer produced by Nippon Seiki Seisakusho K.K. or an ultradisperser produced by IKA K.K.

The cooling rate and precipitating time may optionally be selected since the time of forming precipitates is different depending on the solubility of the resin or dissolution conditions, but generally it is preferred to provide a precipitating time of one hour or more after cooling to room temperature for 1 to 2 hours. If no precipitation time is provided, it may cause delay in precipitation of the resin due to its sypercooled state.

Also, bad solvents to be used include water, methanol, isopropyl alcohol, acetone, toluene, etc.

Also, the case where cooling is effected by using particularly concentrated solution of the resin is as follows:

When a hot concentrated solution is cooled, it does not stop at a jelly-like state but rather as solid material such as wax or soap. By using this physical property, it can be effected to coat the resin on the magnetic powder simultaneously with grinding thereof. That is, by adding dropwise a hot solution of the resin to magnetic powder preheated to a temperature which is the same as the hot solution of the resin under high speed dispersion and stirring, and cooling, the resin can be coated on the magnetic powder and grinding can be carried out simultaneously by precipitating and solidifying the resin.

As the stirring disperser, a dry type disperser such as Henshel mixer, high speed mixer and super mixer, etc can be used. At the time of disperse by these mixers, grinding ability can be increased by adding a ball made of ceramics such as an alumina, etc.

Also, the concentration of the resin solution is preferably 2 (g/dl) or more. If it is less than 2 (g/dl), it becomes a jelly-like state and aggregation is inevitable so that it is impossible to carry out coating and grinding simultaneously. In this method, when the amount of the solvent is decreased as little as possible, productivity can be increased but as the amount of the solvent is decreased, the resin does not dissolve completely in the solvent whereby a uniform solution cannot be obtained. That is, the solution concentration may optionally be selected at which coating and grinding can be carried out simultaneously and easily in the concentraion range wherein the resin is dissolved in the solvent uniformly, and generally it is preferred to 5 to 25 (g/dl). Also, by drying under reduced pressure at a temperature of 100° C. or higher while carrying out dispersion and grinding simultaneously in a mixer, the solvent can be removed.

The resin-coated magnetic powder obtained by this method is subjected to compression molding without removing the solvent to carry out desolvation (solvent removal) simultaneously with compression molding. Also, when desolvation is effected before molding, after adding a bad solvent so as to become a slurry containing 30 to 50% by weight of the magnetic powder, the solvent can be removed with the bad solvent by using an instantaneous vacuum drying device.

(4) Method by Volatilization or Evaporation of the Solvent in a Gel

A gel (solid component) previously prepared from a resin solution and magnetic powder are dispersed and mixed, and then removal of the solvent was carried out while effecting dispersion and grinding whereby adhering to or coating on the magnetic powder can be carried out.

As the mixer, a Henshel mixer in method (3) can be used. Also, in order to improve grinding ability, balls may be used in combination. The size, hardness or number of balls may be optionally determined depending on grinding ability.

The concentration of the resin solution is preferably 5 to 25 g/dl. If it is less than 5 g/dl, an amount of the solvent to be used increases so that productivity decreases, while if it exceeds 25 g/dl, dispersion of a gel is likely to become ununiform.

Regarding the magnetic powder coated or adhered with the thermopiastic resin, obtained by the above methods (1) to (4), grinding treatment is carried out, if necessary. For this grinding treatment, it is preferred to use an impact type mill and more specifically, a hammer mill (for example, a sample mill produced by Fuji Powdal K.K., or an atomizer) may be applied. This is to supply a resin-coated magnetic powder from a hopper via a feeder to a hammer-shaped rotary wing rotating with high speed (6000 to 12,000 rpm), to collide with the hammer, whereby the grinding treatment is carried out.

This grinding is generally carried out at a normal temperature and normal pressure, but it may be carried out at a low temperature by using a coolant such as dry ice, etc. or a liquid nitrogen atomsphere. Also, in case of using a rare earth magnetic powder, in order to avoid oxidation due to collision, it is preferred to effect the procedure at a low temperature under an inert gas atmosphere such as liquid nitrogen, etc. The shearing force to be applied may be optionally selected depending on the number of rotation and numbers of grinding treatments.

Thus, the magnetic powder material of the present invention can be prepared. Also, for preparing a resin-bonded type magnet of the present invention, the resin-coated (or adhered) magnetic powder material obtained by the above methods is, if necessary, ground, and then molded. For molding, various means such as the hot compression molding, the cold compression molding, etc can be used. Among these, the cold compression molding is the particularly optimum one since productivity is high and there is no fear in lowering magnetic characteristics.

For conducting the cold compression molding, the molding pressure may be set at or more than a pressure that causes plastic deformation to the binder resin, but generally it is optionally selected within the range of not less than 1 t/cm$^2$. Also, a temperature is sufficient at a room temperature. By the cold compression, the binder resin causes plastic deformation to adhere therewith so that strength of the molded material obtained is increased, whereby a resin-bonded type magnet having excellent physical properties can be obtained. In the present invention, since the crystalline thermoplastic resin is used as the binder resin, particularly, compression molding is possible even at a room temperature. Here, if the amorphous thermoplastic resin is used, it is hard or impossible to effect cold compression molding at not more than the glass transition temperature since elongation at breakage is small.

Also, for effecting this cold compression, an anisotropic resin-bonded type magnet can be obtained while the procedure is carried out by applying a magnetic field. In this case, it is effective to apply a magnetic field of 15 kOe or more. Also, if the cold compression molding is effected without applying a magnetic field, an isotropic resin-bonded type magnet which is capable of magnetizing to all directions can be obtained.

After compression molding, if necessary, heat treatment may be carried out. This heat treatment may only be carried out by allowing the magnet to stand at a temperature not less than the softening (pour) point or the melting point of the resin for several minutes. By this heat treatment, the resin is fused and crystallized whereby recombination is progressed and the strength of the resinbonded type magnet can further be improved.

Further, magnetization after molding is carried out by the conventional method such as applying a magnetic field of 20 kOe or more.

In the method for preparing the resin-bonded type magnet according to the present invention, a magnetic powder material to which a resin is coated or adhered by the other methods may be used, and the magnetic powder material obtained by the method for preparing the magnetic powder material of the present invention may be molded to a magnet obtained by the other methods, but by combining both methods of the present invention, production stability and mass productivity can be improved, whereby magnets having excellent characteristics can easily be obtained.

As explained above, the magnetic powder material and the resin-bonded type magnet of the present invention are good in preservability as compared with the case where a thermosetting resin is used as a binder since its chemical stability with a lapse of time is excellent.

On the other hand, according to the method for preparing the resin-bonded type magnet of the present invention, a practically endurable magnet can be prepared easily, which is excellent in heat resistance, chemical resistance, water absorption resistance, dimensional stability with a lapse of time, dimensional stability at molding, linear expansion coefficient, etc. And yet, a magnet can be molded by the cold compression molding, without heating, so that production step is simple and inexpensive in costs such as equipment and working, and also excellent in production stability and mass productivity.

Accordingly, the resin-bonded type magnet in the present invention can be widely and effectively utilized for various electric and electronic devices including motors, etc. used in places with high temperature circumstances or requiring chemical resistance.

Also, according to the method for preparing the magnetic powder material of the present invention, a magnetic powder material suitable with the above method for preparing the resin-bonded type magnet can be effectively prepared.

Next, the present invention will be described in more detail by referring to Examples.

Starting materials and devices used in the following Examples are as follows:

(1) Magnet Powder

Ferrite powder

Strontium ferrite; $SrO \cdot 6Fe_2O_3$
OP-71 produced by Nippon Bengara Industry K.K.
(a product surface treated with a silane coupling agent)
Rare earth cobalt powder
Samarium cobalt 2-17 series; $Sm_2Co_{17}$
R-30 produced by Shinetsu Chemical Industries, Ltd.
(32 mesh under):

Into a bortex pulverizer, 3 kg of magnetic powder and 5 liters of isopropanol were introduced, and after replacing the atmosphere with $N_2$ gas therein sufficiently, pulverization was carried out for 7 minutes and classified to obtain a powder having an average particle size of 37 $\mu$m. The resulting magnetic powder (3 kg) was introduced into a supermixer and the temperature was raised to 100° C. under a $N_2$ gas atmosphere, and 300 g of an isopropanol solution containing 10% of a silane coupling agent (A-1120 produced by Nippon Unicar K.K. (N-$\beta$-aminoethyl-$\gamma$-amino-propyltrimethoxy-silane)) was added dropwise over 5 minutes. Thereafter, stirring was continued for 10 minutes, subsequently desolvation (solvent removal) was carried out by blowing nitrogen gas. Then, the mixture was maintained in an oven at 100° C. for one hour.

Neodium Series Magnetic Powder (Rare earth-iron-boron powder): $Nd_2Fe_{14}B$
MQ-II powder produced by General Motors Co., Ltd.

Into a ball mill was introduced 3 kg of magnetic powder, and while stirring, 500 g of a toluene solution containing 3% by weight of titanate coupling agent (KRTTS: isopropyltriisostearoyltitanate produced by Ajinomoto K.K.) was added dropwise and the mixture was treated for 6 hours. Under a 80° C. bath, the mixture was dried by using an aspirator, and further vacuum dried at 60° C. and classified to obtain a powder having an average particle size of 37 μm.

(2) Resin Binder

Polyphenylene sulfide (PPS): Examples 1 to 5,7,8 and 11 are produced by Philips Co., Ltd. and others are produced by Idemitsu Petrochemical Co., Ltd. (limiting viscosity 0.2 dl/g, 206° C., α-chloronaphthalene).

Polyether ether ketone (PEEK): Produced by Mitsui Toatsu K.K., limiting viscosity 0.85 dl/g.

Epoxy resin: Mixture of Epirets SU-8 (produced by Celaneese Co., Ltd.) (R) and 1-(2-hydroxy-propyl)-2methylimidazole (C) (C/R ratio=0.04).

(3) Stirring Disperser

Ultradisperser produced by IKA Co., Ltd. (rotary number: 10,000 rotations per minute).

(4) Instantaneous Vacuum Drying Device

Cracks system produced by Orient Chemical Industry Co., Ltd.

(5) Dipserser (High Speed Mixer)

LFG-GS-1 Type (agitator rotary number: 2000 rotations per minute) produced by Shinko Industry Co., Ltd.

EXAMPLES 33 to 44

Here, by using starting materials and conditions shown in Table 6, magnets were prepared by cold compression molding.

Magnet powder, a binder resin and α-chloronaphthalene or p-chlorophenol as a solvent were mixed in a flask and the binder was dissolved by heating to 240° C. under an argon stream, and then the mixture was gradually cooled to 50° C. over 4 hours while stirring to coat the surface of the magnetic powder with the binder resin by precipitation. After washing the residual solvent, it was dried. In a flask was charged 10 g (the value precisely measured is $W_1$) of the magnetic powder after resin coating, and by using 150 ml of α-chloronaphthalene in case of PPS and 150 ml of p-chlorophenol in case of PEEK, dissolution and extraction under heating was carried out at a temperature of 250° C. in case of PPS and at 60° C. in case of PEEK. After repeating the above procedure by causing no nebula to form when water was added to the extracted filtrate, p-chlorophenol remained in the magnetic powder was removed by methanol and then the powder was vacuum dried at 50° C. A weight ($W_2$) of the resulting magnetic powder removing the coated resin was measured and a decreased weight was made as the amount of the coated resin. The amount of the coated resin (% by weight) was calculated from the following equation (hereinafter the same).

$$\text{Coated polymer amount (\% by weight)} = \frac{W_1 - W_2}{W_1} \times 100$$

Provided that when the strontium ferrite powder was used, the powder was ground by a grinding machine after coating with the resin.

Then, by using a magnetic field compression molding device (produced by High Tech Co., Ltd.), molding was effected at a magnetic field of 15 kOe and at room temperature to obtain a square pillar sample having an approximate dimension of 8×14×7 mm and a cylinder sample having a diameter of 20 mm and 10 g/each.

The resulting samples were subjected to heat treatment in an oven of an argon atmosphere for 3 minutes, and then magnetization was carried out in a magnetic field of 20 kOe to obtain permanent magnets.

With respect to these permanent magnets, the following experiments were carried out and the results are shown in Table 1. Thermal deformation temperature: according to ASTM-D648. Load 18.6 kg/cm².

Compression strength: according to JIS-K7208.

Water absorbing ratio: according to ASTM-D570.

COMPARATIVE EXAMPLES 3 and 4

An epoxy resin, magnetic powder and acetone were mixed at room temperature, and after impregnation, desolvation (solvent removal) was carried out under reduced pressure. The resulting magnetic powder was compression molded in a magnetic field in the same manner as in Examples described above, and then curing treatment was carried out under an argon atmosphere at 150° C. for one hour. This was magnetized in the same manner as in Examples to obtain permanent magnets.

With respect to the rbsulting magnets, the same experiments were carried out and the results are shown in Table 6.

TABLE 6

| No. | Magnetic powder | Resin Kinds | Resin Coated amount (% by weight) | Amount of resin (g) | Amount of magnetic powder (g) | Amount of solvent (ml) | Heating (°C.) | Molding pressure (t/cm) | Heat treatment temperature (°C.) |
|---|---|---|---|---|---|---|---|---|---|
| Example 33 | SrO 6Fe₂O₃ | PPS | 1.32 | 1.40 | 98.6 | 30 | 250 | 4 | 310 |
| Example 34 | SrO 6Fe₂O₃ | " | 1.84 | 1.90 | 98.1 | 40 | " | " | 305 |
| Example 35 | SrO 6Fe₂O₃ | " | 2.96 | 3.00 | 97.0 | 50 | " | " | 300 |
| Example 36 | SrO | " | 1.84 | 1.90 | 98.1 | 40 | " | 5 | 305 |

TABLE 6-continued

| | | | | | | | | | |
|---|---|---|---|---|---|---|---|---|---|
| Example 37 | SrO 6Fe$_2$O$_3$ | " | 1.84 | 1.90 | 98.1 | 40 | " | 6 | 305 |
| Example 38 | SrO 6Fe$_2$O$_3$ | PEEK | 1.76 | 1.80 | 98.2 | 40 | " | 4 | 370 |
| Example 39 | Sm$_2$Co$_{17}$ | PPS | 0.93 | 1.00 | 99.0 | 30 | " | " | 305 |
| Example 40 | " | " | 1.44 | 1.50 | 98.5 | 40 | " | " | 300 |
| Example 41 | " | PEEK | 0.96 | 1.00 | 99.0 | 30 | " | " | 370 |
| Example 42 | " | " | 1.12 | 1.20 | 98.8 | 40 | " | " | 370 |
| Example 43 | Nd$_2$Fe$_{14}$B | PPS | 1.27 | 1.50 | 98.5 | 40 | " | " | 305 |
| Example 44 | " | PEEK | 1.25 | 1.50 | 98.5 | 40 | " | " | 370 |
| Comparative Example 3 | Sm$_2$Co$_{17}$ | Epoxy resin | 2.0 | 2.0 | 98.0 | 50 | Room temperature | " | 150 |
| Comparative Example 4 | Nd$_2$Fe$_{14}$B | Epoxy resin | 2.0 | 2.0 | 98.0 | 50 | Room temperature | " | 150 |

| | | Characteristics of molded material | | | | | |
|---|---|---|---|---|---|---|---|
| | | Thermal | | | Magnetic characteristics | | |
| No. | Magnetic powder | deformation temperature (°C.) | Water absorbing ratio (10$^{-3}$%) | Compression strength (kg/cm) | Residual magnetic flux density Br (KG) | Coersive force bHc (KOe) | Maximum energy product $(BH)_{max}$(MGOe) |
| Example 33 | SrO 6Fe$_2$O$_3$ | 280 | 3.7 | 810 | 2.65 | 2.30 | 1.70 |
| Example 34 | SrO 6Fe$_2$O$_3$ | 279 | 4.8 | 780 | 2.56 | 2.37 | 1.62 |
| Example 35 | SrO 6Fe$_2$O$_3$ | 277 | 5.1 | 750 | 2.37 | 2.12 | 1.38 |
| Example 36 | SrO 6Fe$_2$O$_3$ | 2.80 | 4.6 | 800 | 2.61 | 2.29 | 1.65 |
| Example 37 | SrO 6Fe$_2$O$_3$ | 280 | 4.5 | 820 | 2.68 | 2.31 | 1.72 |
| Example 38 | SrO 6Fe$_2$O$_3$ | 328 | 4.9 | 1120 | 2.57 | 2.39 | 1.64 |
| Example 39 | Sm$_2$Co$_{17}$ | 280 | 3.8 | 760 | 8.0 | 6.2 | 14.1 |
| Example 40 | " | 279 | 4.9 | 740 | 7.5 | 6.3 | 12.8 |
| Example 41 | " | 330 | 4.3 | 1010 | 8.0 | 6.2 | 14.3 |
| Example 42 | " | 328 | 4.9 | 1000 | 7.6 | 6.4 | 13.2 |
| Example 43 | Nd$_2$Fe$_{14}$B | 279 | 4.6 | 740 | 5.4 | 4.8 | 7.3 |
| Example 44 | " | 328 | 4.7 | 980 | 5.4 | 4.8 | 7.2 |
| Comparative Example 3 | Sm$_2$Co$_{17}$ | 200 | 8.2 | 460 | 6.6 | 8.0 | 14.7 |
| Comparative Example 4 | Nd$_2$Fe$_{14}$B | 205 | 8.0 | 380 | 6. | 5.3 | 8.0 | a. Coating Step

EXAMPLE 45

In to a glass apparatus supplied therein 975 g of ferrite powder preheated to 200° C. and equipped with a 5 liter jacket was poured at 250° C. 2 liters of α-chloronaphthalene resin solution dissolved therein 25 g of PPS resin, and then the mixture was cooled to room temperature by flowing cold water in the jacket while vigorously stirring and dispersing with a stirring disperser.

Thereafter, stirring and dispersing were carried out while adding dropwise 6 liters of isopropyl alcohol from a dropping funnel over 30 minutes. The resulting slurry was subjected to solvent replacement due to decantation using 2 liters of isopropyl alcohol and repeated three times, and then the solvent was removed by an instantaneous vacuum drying device. Working conditions of the instantaneous vacuum drying device were a heating pipe jacket temperature of 130° C., a temperature in the powder collecting room of 120° C., vacuum degree of 35 torr, a liquid transferring pump of 250 cc/min and a discharging pressure of 0.1 to 2.5 kg/cm$^2$.

EXAMPLE 46

In the same manner as in Example 45 except for replacing the ferrite powder with neodium series magnetic powder, resin coating was carried out under an inert atmosphere of argon stream.

EXAMPLE 47

In the same manner as in Example 45 except for replacing the ferrite powder with samarium cobalt series magnetic powder, resin coating was carried out under an inert atmosphere of argon stream.

EXAMPLE 48

In to the glass apparatus supplied therein 975 g of ferrite powder preheated to 150° C. and equipped with a 5 liter jacket was poured at 180° C. 2 liters of dichloroacetic acid resin solution dissolved therein 25 g of PEEK resin, and then the mixture was cooled to room temperature by flowing cold water in the jacket while vigorously stirring and dispersing with a stirring disperser.

Thereafter, stirring and dispqrsing were carried out while adding dropwise 6 liters of isopropyl alcohol from a dropping funnel over 30 minutes, The resulting slurry was subjected to solvent replacement, due to decantation using 2 liters of isopropyl alcohol and repeated three times, and then the solvent was removed by an instantaneous vacuum drying device. Working conditions of the instantanveous vacuum drying device were a heating pipe jacket temperature of 130° C., a temperature in the powder collecting room of 120° C., vacuum degree of 30 torr, a liquid transferring pump of 250 cc/min and a discharging pressure of 0.1 to 2.0 kg/cm$^2$.

EXAMPLE 49

In the same manner as in Example 48 except for replacing the ferrite powder with neodium series magnetic powder, resin coating was carried out in the same manner as in Example 48 under an inert atmosphere of argon stream.

EXAMPLE 50

In the same manner as in Example 48 except for replacing the ferrite powder with samarium cobalt series magnetic powder, resin coating was carried out in the same manner as in Example 48 under an inert atmosphere of argon stream.

EXAMPLE 51

In 3 liters of a-chloronaphthalene was dissolved 18 g of PPS resin at 205° C., and while strongly stirring and dispersing with a stirring disperser, 982 g of ferrite magnetic powder was supplied to an instantaneous vacuum drying apparatus through a transfer pump to effect direct solvent removal. Working conditions of the instantaneous vacuum drying apparatus were a heating pipe jacket temperature of 170° C., a temperature in a powder collecting room of 160° C., vacuum degree of 30 torr, a liquid transferring pump of 250 cc/min and a discharging pressure of 0.1 to 0.2 kg/cm$^2$.

EXAMPLE 52

In the same manner as in Example 51 except for replacing the ferrite powder with neodium series magnetic powder, resin coating was carried out as in Example 51 under an inert atmosphere of argon stream.

EXAMPLE 53

In the same manner as in Example 51 except for replacing the ferrite powder with samarium cobalt series magnetic powder, resin coating was carried out as in Example 51 under an inert atmosphere of argon stream.

EXAMPLE 54

In to 2 liters of dichloroacetic acid was dissolved 18 g of PEEK resin at 150° C., and while strongly stirring and dispersing with a stirring disperser, 982 g of ferrite magnetic powder was supplied to an instantaneous vacuum drying apparatus with a stirring disperser through a transfer pump to effect direct solvent removal. Working conditions of the instantaneous vacuum drying apparatus were a heating pipe jacket temperature of 160° C., a temperature in the powder collecting room of 160° C., vacuum degree of 30 torr, a liquid transferring pump of 250 cc/min and a discharging pressure of 0.1 to 2.5 kg/cm$^2$.

EXAMPLE 55

In the same manner as in Example 54 except for replacing the ferrite powder with neodium series magnetic powder, resin coating was carried out as in Example 54 under an inert atmosphere of argon stream.

EXAMPLE 56

In the same manner as in Example 54 except for replacing the ferrite powder with samarium cobalt series magnetic powder, resin coating was carried out as in Example 54 under an inert atmosphere of argon stream.

EXAMPLE 57

In 200 ml of a a-chloronaphthalene was dissolved under heating 18 g of PPS at 250° C., and this was added dropwise in an apparatus of a disperser supplied therein 982 g of ferrite powder preheated to 240° C. under high speed dispersing and stirring over 5 minutes. Then, while the mixture was cooling to room temperature by flowing water in the jacket, it was dispersed, mixed and stirred by setting an agitator to 1500 rpm. At the same time, solvent removal was also carried out at 130° C. and by coexisting balls to effect grinding, whereby resin coated magnetic powder was prepared. A hundred balls made of alumina and having a diameter of 10 mm were used.

EXAMPLE 58

In the same manner as in Example 57 except for replacing the ferrite powder with neodium series magnetic powder, resin coating was carried out in the same manner as in Example 57 under an inert atmosphere of argon stream.

EXAMPLE 59

In the same manner as in Example 57 except for replacing the ferrite powder with samarium cobalt series magnetic powder, resin coating was carried out in the same manner as in Example 57 under an inert atmosphere of argon stream.

EXAMPLE 60

In the same manner as in Example 57 except for replacing PPS with PEEK, resin coating was carried out in the same manner as in Example 57 under an inert atmosphere of argon stream.

EXAMPLE 61

In the same manner as in Example 58 except for replacing PPS with PEEK, resin coating was carried out in the same manner as in Example 58 under an inert atmosphere of argon stream.

EXAMPLE 62

In the same manner as in Example 59 except for replacing PPS with PEEK, resin coating was carried out in the same manner as in Example 59 under an inert atmosphere of argon stream.

EXAMPLES 63 to 68

In to 120 ml of a-choronaphthalene as a solvent was dissolved 18 g of the following resins by heating at 240° C. under stirring to obtain a hot solution. 15 g/dl of this hot solution was cooled to room temperature to prepare a solid material (gel).

Next, 982 g of the following magnetic powder and the previously prepared gel (15 g/dl) containing a solvent were supplied in a disperser and dispersing and mixing were carried out with an agitator at 1000 rpm. Thereafter, while carrying out vacuum drying at 130° C., grinding with an agitator at 1500 rpm (in the copresence of 100 balls having a diameter of 10 mm and made of alumina) and simultaneously with solvent removal were carried out to prepare resin coated magnetic powder. Provided that when rare earth series magnetic powder was used, supplying was effected under inert atmosphere.

Kinds of Magnetic Powder and Resin

EXAMPLE 63

A Ferrite magnetic powder and PPS gel

EXAMPLE 64

Neodium series magnetic powder and PPS gel

EXAMPLE 65

Samarium cobalt series magnetic powder and PPS gel

EXAMPLE 66

Ferrite magnetic powder and PEEK gel

EXAMPLE 67

Neodium series magnetic powder and PEEK gel

EXAMPLE 68

Samarium cobalt series magnetic powder and PEEK gel b. Grinding Step

The ferrite magnetic resin-coated powder obtained in the above Examples 45, 48, 51 and 54 were effected grinding twice by using a grinding machine (produced by Fuji Powdal K.K., Sample mill) at 10000 rpm, respectively, and the rare earth series magnetic resincoated powder obtained in Examples 46, 47, 49, 50, 52, 53, 55 and 56 were effected grinding once by useing the same machine and flowing a liquid nitrogen with copresence thereof at 6000 rpm, respectively.

c. Compression Molding Step

The anisotropic ferrite magnetic resin-coated powder of the above Examples 45, 48, 51 and 54 after grinding, and the anisotropic ferrite magnetic resin-coated powder obtained in Examples 57, 60, 63 and 66 were subjected to compression molding at room temperature and an applied pressure of 3 ton/cm² in a magnetic field of 10 kOe.

The anisotropic samarium cobalt magnetic resin-coated powder of the above Examples 46, 49, 52 and 55 after grinding, and the anisotropic samarium cobalt magnet resincoated powder obtained in Examples 58, 61, 65 and 68 were subjected to compression molding at room temperature and an applied pressure of 6 ton/cm² in a magnetic field of 10 kOe.

The isotropic neodium magnetic resin-coated powder of the above Examples 46, 50, 53 and 56 after grinding, and the isotropic neodium magnetic resin-coated powder obtained in Examples 59, 62, 64 and 67 were subjected to compression molding at room temperature and an applied pressure of 7 ton/cm² in a non-magnetic field.

A test piece for measuring thermal deformation temperature mentioned hereinafter was molded to a square pillar shape having 8×14×7 mm and a test piece for measuring bending strength was molded to a shape of 40×4×3 mm, respectively.

d. Thermal Treatment

With respect to each magnet after the above compression molding, it was exposed at 350° C. for 3 minutes and then at 260° C. for 5 minutes. Provided that rare earth ones were subjected under an inert atmosphere of argon stream.

e. Magnetization

To the anisotropic ferrite magnet, 15 kOe of the magnetic field was applied and to the rare earth series magnet, 20 kOe was applied.

Regarding each magnet thus prepared, various experiments were carried out and the results are shown in Table 2. The experimental conditions are as follows:
Bending strength: According to JIS-R1601
Thermal deformation temperature: According to ASTM-D648 Load 18.6 kg/cm²
Compression strength: According to JIS-K7208.

TABLE 7

| | Thermal deformation temperature (°C.) | Water absorbing ratio ($10^{-3}\%$) | Linear expansion coefficient (cm/cm °C.) × $10^{-6}$ | Bending strength (kg/cm²) | Residual magnetic flux density Br (KG) | Specific coersive force iHc(KOe) | Maximum energy product $(BH)_{max}(MGOe)$ | Coated resin amount (wt %) |
|---|---|---|---|---|---|---|---|---|
| Example 45 | 246 | 4.9 | 3.0 | 650 | 2.55 | 2.28 | 1.46 | 2.1 |
| Example 46 | 248 | 4.3 | 3.2 | 600 | 6.10 | 8.25 | 8.30 | 1.3 |
| Example 47 | 249 | 4.6 | 3.1 | 700 | 8.50 | 10.50 | 16.30 | 1.8 |
| Example 48 | 290 | 5.9 | 3.6 | 550 | 2.57 | 2.18 | 1.49 | 2.3 |
| Example 49 | 285 | 5.4 | 3.8 | 500 | 6.00 | 8.20 | 8.00 | 1.5 |
| Example 50 | 287 | 5.7 | 3.7 | 600 | 8.45 | 10.55 | 16.20 | 1.9 |
| Example 51 | 250 | 4.7 | 3.0 | 670 | 2.65 | 2.36 | 1.55 | 1.8 |
| Example 52 | 248 | 6.0 | 3.2 | 620 | 6.30 | 8.30 | 8.50 | 1.8 |
| Example 53 | 246 | 5.5 | 3.1 | 730 | 8.60 | 10.60 | 16.35 | 1.8 |
| Example 54 | 290 | 6.0 | 3.8 | 570 | 2.60 | 2.30 | 1.50 | 1.8 |
| Example 55 | 287 | 5.5 | 3.7 | 520 | 6.20 | 8.20 | 8.26 | 1.8 |
| Example 56 | 288 | 5.8 | 3.6 | 620 | 8.50 | 10.50 | 16.15 | 1.8 |
| Example 57 | 244 | 4.3 | 3.1 | 680 | 2.60 | 2.36 | 1.56 | 1.7 |
| Example 58 | 246 | 4.0 | 3.3 | 630 | 6.30 | 8.45 | 8.60 | 1.7 |
| Example 59 | 247 | 4.3 | 3.2 | 730 | 8.70 | 11.00 | 17.50 | 1.7 |
| Example 60 | 288 | 5.5 | 3.7 | 580 | 2.62 | 2.32 | 1.59 | 1.7 |
| Example 61 | 283 | 5.1 | 3.9 | 530 | 6.50 | 8.50 | 8.80 | 1.8 |
| Example 62 | 285 | 5.4 | 3.8 | 630 | 8.65 | 10.70 | 16.80 | 1.8 |
| Example 63 | 277 | 4.5 | 3.1 | 630 | 2.54 | 2.25 | 1.45 | 1.8 |
| Example 64 | 276 | 4.3 | 3.3 | 600 | 6.12 | 8.34 | 8.32 | 1.7 |
| Example 65 | 280 | 4.5 | 3.0 | 690 | 8.55 | 10.55 | 16.40 | 1.8 |
| Example 66 | 325 | 5.5 | 3.5 | 570 | 2.57 | 2.20 | 1.52 | 1.8 |
| Example 67 | 322 | 5.3 | 3.7 | 510 | 6.00 | 8.25 | 8.20 | 1.7 |
| Example 68 | 326 | 5.6 | 3.6 | 680 | 8.48 | 10.56 | 16.22 | 1.8 |

Also, regarding the magnet of PPS-coated obtained in Example 46 and the magnet of PEEK-coated obtained in Example 55, chemical resistance, dimensional stability with a lapse of time and dimensional stability at molding were evaluated. The results are shown in Table 8 (chemical resistance of the magnet PPS-coated), Table 9 (chemical resistance of the magnet PEEK-coated), Table 10, (dimensional stability with a lapse of time) and Table 11 (dimensional stability at molding).

The chemical resistance was according to JIS-K7114 and visual inspection and measurements of changes in weight and dimension were carried out.

TABLE 8

| Chemicals | Chemical resistance | Chemicals | Chemical resistance |
|---|---|---|---|
| Hydrochloric acid (10%) | ⊚ | Toluene | ⊚ |
| Sulfuric acid (10%) | ⊚ | Xylene | ⊚ |
| dil. Nitric acid (5%) | ⊚ | Methyl alcohol | ⊚ |
| conc. aqueous ammonia | ⊚ | Butyl alcohol | ⊚ |
| Saline (saturated) | ⊚ | Formalin | ⊚ |
| Potassium carbonate (saturated) | ⊚ | Acetone | ⊚ |
| Formic acid (10%) | ⊚ | Methyl alcohol | ⊚ |
|  |  | Ethyl acetate | ⊚ |
| Acetic acid | ⊚ | Diethyl ether | ⊚ |
| Pyridine | ⊚ | Trichloroethylene | ⊚ |
| Benzene | ⊚ | Carbon tetrachloride | ⊚ |

⊚: No change in weight and dimension.
○: Usable depending on the conditions.
△: Dissolved or swelled

TABLE 9

| Chemicals | Chemical resistance | Chemicals | Chemical resistance |
|---|---|---|---|
| Hydrochloric acid (10%) | ○ | Toluene | ⊚ |
| Sulfuric acid (10%) | ⊚ | Xylene | ⊚ |
| dil. Nitric acid (5%) | ⊚ | Methyl alcohol | ⊚ |
| conc. aqueous ammonia | △ | Butyl alcohol | ⊚ |
| Saline (saturated) | ⊚ | Formalin | ⊚ |
| Potassium carbonate (saturated) | ⊚ | Acetone | ⊚ |
| Formic acid (10%) | ⊚ | Methyl alcohol | ⊚ |
|  |  | Ethyl acetate | ⊚ |
| Acetic acid | ⊚ | Diethyl ether | ⊚ |
| Pyridine | ⊚ | Trichloroethylene | ⊚ |
| Benzene | ⊚ | Carbon tetrachloride | ⊚ |

⊚: No change in weight and dimension.
○: Usable depending on the conditions.
△: Dissolved or swelled.

|  | Changed ratio in dimension (%) |
|---|---|
| PPS | 0.001 |
| PEEK | 0.004 |

Maximum value of dimension changed in a month.

$$\text{Changed ratio in dimension (\%)} = \frac{\text{Dimension at present} - \text{Standard dimension}}{\text{Standard dimension}} \times 100$$

Standard dimension:
Dimension immediately after thermal treatment (room temperature)
Test piece:
Approximate dimension 8 × 14 × 7 mm

TABLE 11

|  | Changed ratio in dimension after heat treatment (%) |
|---|---|
| PPS | 0.012 |
| PEEK | 0.010 |

$$\text{Changed ratio in dimension after heat treatment (\%)} = \frac{\text{Dimension after heat treatment} - \text{Dimension before heat treatment}}{\text{Dimension before heat treatment}} \times 100$$

The metal or alloy powder to be used in the powder molding of the present invention is iron, brass, nickel silver, stainless steel or aluminum, or a mixture comprising two or more thereof.

Iron includes various ones such as electrolytic iron, carbonyl iron, atomized iron, Permalloy (Fe-Ni base alloy), and Sendust (Fe-Si-Al base alloy). More specifically, low carbon steel, medium carbon steel, high carbon steel, high tension steel (HT80), manganese steel for mechanical structures, chromium steel (SCr430), chromium molybdenum steel (SCM440), nickel chromium steel, case hardened steel, low temperature steel, marageing steel (250), high manganese steel (Hadfield steel), Inconel 600, Inconel X750, Incoly 800, Hastelloy X, Sterite 6B, Nimonic alloy 80A, tool steel (SKD6), grey cast iron, spherical graphite cast iron, black heart malkable cast iron, and the like can be used.

Brass includes 7/3 brass (C2600), 65/35 brass (C2680), 6/4 brass (C2801), free cutting grass (C3710), Naval brass (C4621), and the like.

Nickel silver includes nickel silver (C7521) and the like.

Stainless steel includes martensite base stainless steel (SUS410), ferrite base stainless steel (SUS405), austenite base stainless steel (SUS304), precipitation hardening type stainless steel (SUS631), SUS314, SUS316, and the like.

Aluninum includes industrial pure aluminum (Al 100 H18), duralmin (A2017-T4), super duralmin (A2024-T4), ultra super duralmin (A7075-T6), anti-corrosion aluminum (A5083-H32), anti-corrosion aluminum (a6O63-T6), Lautal (AC2A-T6), silumin (AC3a-F), aluminum casting alloy (AC4CH-T6), aluminum diecast alloy (ADC12), and the like.

In connection with the particle size distribution (compression density) of the above metal or alloy powder, in order to increase the molding density and to decrease the amount of voids formed during molding, thereby increasing the mechanical strength, it is preferred that the particle size distribution be higher. It is desirable that the particle size distribution is broad. Although it is desirable that the particle form is spherical, in some case, a mixture of particles which are irregular and uneven in shape is preferably used. The average particle diameter of the metal or alloy powder is not more than 500 μm, preferably not more than 200 μm, and more preferably not more than 50 μm.

For production of structural members such as mechanical parts which are required to have a high mechanical strength, metal powder particles are suitable. As the powder particles, a mixture of particles which are irregular and uneven in the shape is preferably used, and the width of distribution of particle diameters is preferably from about 37 to 150 μm.

An apparent density is a physical property of a powder which reflects the particle shape, and it is specified by JIS Z2504-1979.

For example, reduced iron powder (apparent density: 2.3 to 2.8, preferably 2.6 to 2.8, and more preferably 2.7), brass 98, 95, 90, 80, 70, 60 wt % (Cu), or nickel silver (apparent density: 2.5 to 3.0, preferably 2.6 to 2.8, and more preferably 2.7), industrial pure aluminum (purity at least 98%) (apparent density: 0.5 to 2.0, preferably 0.8 to 1.5 and more preferably 1.0), and stainless steel (SUS 314, SUS 316, etc.) (apparent density: 2.5 to 3.0, preferably 2.6 to 2.8, and more preferably 2.7) are suitable.

The metal or alloy powder surface-treated with not more than 3 vol %, particularly about 0.5 to 2 vol % of a coupling agent may be used. This surface treatment increase the affinity of the metal or alloy powder to the thermoplastic resin having heat resistance and crystallinity. Moreover it is effective in preventing oxidation of the metal or alloy powder.

Various coupling agents can be used for the above purposes. Typical examples are titanate-based coupling agents and silane-based coupling agents. Examples of the titanate-based coupling agents are isopropyltriisostearoyl titanate, isopropyltrioctannoyl titanate, isopropyltris(dioctypyrophosphate) titanate, isopropyldimethacrylisostearoyl titanate, isopropyltri(N-aminoethyl-aminoethyl) titanate, isopropyltridecylbenzenesulfonyl titanate, isopropylisostearoyldiacryl titannate, isopropyltri(dioctylphosphate) titanate, isopropyltricumylphenyl titanate, tetraisopropylbis(dioctylphosphite) titanate, tetraoctylbis(ditridecylphosphite)titanate, tetra(2,2-diallyloxymethyl-1-buty)bis(di-tridecyl)phosphite titanate, bis(dioctylpyrophosphate)oxyacetate titanate, and bis(dioctypyrophosphate)ethylene titanate. These compounds can be used singly or in combination with each other.

Examples of the silane-based coupling agents are γ-mercapto-propyl-trimethoxysilane, 2-styryl-ethyltrimethoxysilane, N-β-(aminoethyl) γ-amino-propyltrimethoxysilane, β-(3,4-epoxycyclohexyl)ethyltrimethoxysilane, γ-aminopropyl-trimethoxysilane, γ-glycidoxy-propyltrimethoxysilane, N-phenyl-γ-aminopropyltrimethoxysilane, phenyltrimethoxysilane, and methyldimethoxysilane. These compound can be used singly or in combination with each other.

The titanate-based coupling agent and the silane-based coupling agent can be used in combination.

The surface treatment with the coupling agent may be carried out by wetting the metal or alloy powder with a 5 to 20 vol % solution of the coupling agent in a solvent such as alcohol or toluene and then drying at a temperature not less than room temperature, preferably at 120° to 150° C. This surface treatment with the coupling agent imparts water repellency and lubricity to the powder and increases the mechanical strength and so forth of the resin binder-type molding obtained after molding.

As the thermoplastic resin having heat resistance and crystallinity to be used in the powder molding, various resins can be used. Usually those resins having a melting point of at least 200° C., particularly at least 230° C. are preferred, and those resins having at least one —S— bond or —O— bond in the chemical skeleton thereof are particularly suitable.

Preferred examples of such thermoplastic resins are polyethertherketone (PEEK), polyetherketone (PEK), polyphenylenesulfide (PPS), polysukfideketone (PSK), and polycyanoarylether (polyethernitrile; PEN). As the PEN, a polycyanoarylether-based polymer having a repeating unit represented by the general formula:

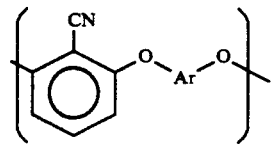

wherein Ar is

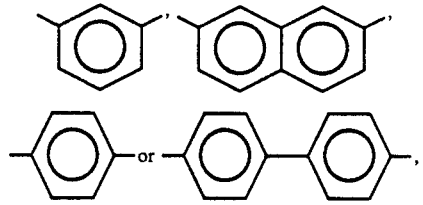

and an intrinsic viscosity [η] at 60° C. with p-chlorophenol as a solvent of at least 0.2 dl/g is particularly preferred.

The molecular weight of the thermoplastic resin having heat resistance and crystallinity is not critical and can be determined appropriately depending on the type, purpose of use, etc. If the molecular weight is too large, an application pressure for molding as described hereinafter is increased, the resin is not easily plasticized by application of pressure, the original shape is sometimes recovered, and the density of the molding is not increased and voids are formed, leading to a decrease in the mechanical strength. On the other hand, if the molecular weight is too small, not only resin coating becomes difficult but the mechanical strength of the molding is decreased. Thus taking these points into consideration, the molecular weight of the resin should be determined.

For example, in the case of PPS, the intrinsic viscosity in an α-chloronaphthalene solvent at 206° C. is preferably at least 0.1 dl/g and particularly preferably 0.15 to 0.3 dl/g. In the case of PEEK, the intrinsic viscosity in a p-chlorophenol solvent at 60° C. is preferably at least 0.3 dl/g and particularly preferably 0.3 to 0.85 dl/g. In the case of PEN, the intrinsic viscosity in a p-chlorophenol solvent at 60° C. is preferably at least 0.2 dl/g and particularly preferably 0.3 to 1.2 dl/g.

In accordance with the process of the present invention, 50 to 97 vol %, preferably 65 to 90 vol % of the metal or alloy powder and 50 to 3 vol %, preferably 35 to 10 vol % of the thermoplastic resin having heat resistance and crystallinity are used. If the resin or alloy powder is leas than 50 vol % (based on the total volume of the metal or alloy powder and the thermoplastic resin), the resin amount is suitable for injection molding rather than for compression molding of powder. On the other hand, if it is more than 97 vol %, molding becomes difficult. In either case, the objects of the present invention cannot be attained.

In structural materials such as mechanical parts for which a high mechanical strength is required, as well as the mechanical strength, a coefficient of linear expansion, hardness, a variation in dimension due to water absorption, etc. are required to be more similar to those of metal. When the above metal or alloy powder is used, the proportion is preferably 3 to 15 vol % (based on the total volume of the metal or alloy powder and the above thermpolastic resin). If the proportion is less than 3 vol %, the strength is not sufficiently high, and if it is more than 15 vol %, the strength is rather decreased. It is preferably 5 to 10 vol %.

In the process for preparation of the resin composition for powder molding of the present invention, the metal or alloy powder and the thermoplastic resin are used in the aforementioned ratios. In the first place, the thermoplastic resin is dissolved in the solvent. As the solvent to be used, a polar solvent having a high ability to dissolve the above resin is preferably used. Examples are N-methylpyrrolidone, α-chloronaphthalene, dichloroacetic acid, 1,3-dimethyl-2-imidazolidinine, dimethylsulfoxide, dimethylacetamide, dimethylformamide, and p-chlorophenol.

The type of the solvent to be used varies with the type and molecular weight of the resin to be used and cannot be determined unconditionally. Usually it is preferred that when PPS is used as the resin, α-chloronaphthalene is used, and when PEEK is used as the resin, dichloroacetic acid and α-chloronaphthalene are preferably used.

The amount of the solvent used varies with the amount of the resin charged, and the type, particle size distribution, wetting properties, adhesion to the resin of the metal or alloy powder. In order to decrease the coagguration among powder particles, it is preferred that the concentration of the mixture obtained by dispersing the powder in the resin solution is as low as about 5 to 50 wt %. Thus it is desirable that the ratio of the resin to the solvent (dl) be 0.1 to 15 (g/dl).

The resin can be dissolved in the solvent by introducing the solvent and the powder resin into a suitable stirring vessel and heating while stirring. In connection with the heating temperature, it is desirable that when N-methylpyrrolidone is used as the solvent, the heating temperature be at least 190° C., and when α-chloronaphthalene is used, it be at least 250° C. This heating and stirring is preferably carried out until the resin is uniformly dissolved.

In accordance with the process of the present invention, the metal or alloy powder is dispersed in the above prepared resin solution to prepare a mixture. Thereafter the solvent of the mixture is gassified or evaporated. Gassification or evaporation of the solvent results in deposition of the thermoplastic resin on the metal or alloy powder. More specifically, for example, a mixed slurry (mixture) of the powder, the resin solution, and a low boiling solvent having a high ability to dissolve therein the resin is sent with a pomp to a heating tube which is overheated to more than the azeotropic point the mixed solvent, and explosively jetted into a room at a high temperature and in vacuum to thereby evaporate or gassify the solvent in a moment.

When it is difficult to choose the mixed solvent with a low boiling solvent having a high ability to dissolve the resin, even if a good solvent is used alone, the gassification or evaporation can be carried out in a moment as long as both the temperatures of the heating tube and the room maintained at a high temperature and in vacuum are more than the boiling point of the solvent.

As an apparatus for the above operation, Cracks System (instaneous vacuum drying apparatus) manufactured by Orient Chemical Industry Co., Ltd., for example, can be employed. In addition, merely by vacuum drying at a temperature of more than 100° C., dispersing and mixing can be carried out while removing the solvent. In this case, for example, a high-speed agitation type mixer such as a Henshel mixer, High-speed mixer or super mixer, and a knead extrusion maching can be employed.

In the process of the present invention, in place of the gassification or evaporation of the solvent, the mixture may be cooled. It is also possible that after the mixture is cooled, the solvent is gassified or evaporated. In the case of cooling, the resin can be deposited on the powder by cooling a heat solution of the resin (a mixture obtained by dispersing the metal or alloy powder in the solution with the resin dissolved therein), and then decreasing the solubility of the resin. A low molecular weight component which cannot be deposited from the solution can be deposited by adding a poor solvent. Also, after cooling, the gassification or evaporation of the solvent may be carried out.

More specifically, a heat solution of the resin uniformly dissolved in a jacketed stirring vessel and the powder are mixed, and the mixture is cooled to room temperature by flowing cooling water in the jacket while dispersing and stirring by the use of a wet dispersion-stirring machine.

In addition, by removing the solvent in a vacuum produced by a vacuum pump while dispersing and mixing with the dispersion stirring machine, almost all of the resin can be deposited and coated.

As the above wet dispersion stirring machine, for example, Ultra Homomixer manufactured by Nippon Seiki Seisakujo Co., Ltd., Ultra Disperser manufactured by IKA Co., Ltd., High-Speed Mixer manufactured by Fukae Kogyo Co., Ltd., and a universal mixing stirring machine manufactured by Shinagawa Seisakujo Co., Ltd.

The cooling speed and the deposition time can be determined appropriately because the time required for the deposition varies with the dissolution ability of the resin and the dissolution conditions. Usually it is preferred that after cooling to room temperature in a time of 1 to 2 hours, the deposition is accomplished over at least one hour. If the deposition time is not provided, deposition of the resin is sometimes retarded by the supercooled state.

Poor solvents which can be used include water, methanol, isopropyl alcohol, acetone, and toluene.

Particularly in the case of a concentrated solution of the resin, cooling is carried out as follows.

On cooling a heat solution of the high concentration resin solution, it becomes a solid material such as wax or soap rather than gelatin-like. By utilizing these physical properties, coating the powder with the resin and granuation can be carried out at the same time. That is, the heat solution of the resin is cooled while dropping on the powder previously heated to the same temperature as that of the heat solution, while dispersing and stirring at a high speed, whereby the resin is coated on the powder and, if necessary, granuation can be carried out at the same time by deposition and solidification of the resin.

As the stirring dispersion machine to be used in this case, for example, a high-speed agitation type dispersing machine such as a Henschel mixer, a high speed mixer or a super mixer can be employed.

The concentration of the resin solution is preferably at least 2 g/dl. If the concentration is less than 2 g/dl, it becomes gelatin-like, and thus aggregation cannot be avoided and it becomes difficult to carry out coating and granulation at the same time. In this process, productivity can be increased by decreasing the amount of the solvent as much as possible, but if the amount of the solvent is decreased excessively, the resin is not completely dissolved in the solvent and no uniform solution can be obtained. That is, a concentration of the solution at which coating and granulation can be easily carried out at the same time within the range that the resin is uniformly dissolved in the solvent is chosen appropriately. Usually it is preferred that the concentration be adjusted to 5 to 25 g/dl. By vacuum drying at a temperature of more than 100° C. while carrying out dispersion and granulation in the mixer at the same time, the solvent can be removed.

In this manner, the resin composition for powder molding can be prepared. In accordance with the process for production of powder molded products in the present invention, a resin coated (or attached) powder material as prepared by the above process is granulated or pulverized, if necessary, and then compression molded. This compression molding is not critical as long as it is carried out under pressure. From a viewpoint of productivity, cold compression molding as a powder metallurgical technique is preferably employed. Hot compression molding at a temperature at which the resin melts can be also employed. In this cold compression molding, the molding pressure is sufficient to be not less than a pressure at which the binder resin begins to undergo plastic deformation. Usually the pressure can be chosen appropriately within the range of at least 1 ton/cm$^2$. In particular, when a metal powder for the above structural material is used as the metal powder and relatively porous parts such as oil-containing bearings are intended to produce, the pressure is preferably 2 to 3 ton/cm$^2$. In the case of mechanical parts not containing oil, the pressure is preferably 4 to 6 ton/cm$^2$. That is, the porosity of the product can be controlled by adjusting the pressure to be applied at the time of powder molding.

Although the temperature is usually preferred to be room temperature from a viewpoint of productivity, a temperature falling between the glass transition temperature and the melting point of the resin can be selected. In order to increase the molding density, it is preferably at least ioolc. This cold compression causes plastic deformation of the binder resin and presses it under pressure, increasing the strength of the resulting molding. As a result, a resin binder-type molding having excellent physical properties can be obtained.

After compression molding, heat treatment is applied, if necessary. For this heat treatment, it suffices that the molding is exposed for several minutes at a temperature not less than the softening (fluidizing) temperature or melting point of the resin. In this heat treatment, recombination proceeds as a result of melting and crystallization of the resin, and the strength of the resin binder-type molding is more increased.

The heat treating temperature is preferably not less than the melting point or glass transition temperature of the resin. For example, in the case of PEEK, it is 360° to 450° C. and preferably 400° to 420° C.; in the case of PPS, it is 290° to 380° C. and preferably 360° to 380° C.; in the case of PEN-R, it is 350° to 400° C. and preferably 360° to 380° C.; and in the case of PEN-N, PEN-H and PEN-B, it is 360° to 400° C. and preferably 370° to 380° C.

(1) PEN-R, (2) PEN-N, (3) PEN-H and (4) PEN-B as used herein refers to, respectively, (1) a polymer of 2,6-dichlorobenzonitrile and resorcinol, (2) a polymer of 2,6-dichlorobenzonitrile and dihydroxynaphthalene, (3) a polymer of 2,6-dichlorobenzonitrile and hydroquinone, and (4) a polymer of 2,6-dichlorobenzonitrile and biphenol.

Powder molded products obtained by the process of the present invention can be used as mechanical parts; any powder molded products can be used as long as they have the same shapes as those of mechanical parts produced by the powder metallurgical technique.

The process of the present invention permits production of long, thin and grooved products which have been impossible or difficult to produce by powder metallurgical sintering. Molding conditions and so forth can be determined appropriately depending on their application. Typical examples of such applications are a can, a sprocket, a bulb plate, a bracket, a gasket, a washer, a crank rod, a gear, a magnet cratch, a pulley, a fly wheel, a rim, a frame, a hook lever, a key groove, a handle, a switch knob, a volume knob, an oil-containing bearing, a hinge, a motor cover, a transformer cover, an arm, a handle, a pin, a valve, a link, a bearing retainer, a coil bobbin, a slit, an impeller, a fly wheel, a shaking spindle, a lens receiver, and a tool.

Powder molded products obtained using soft magnetic powder can be used as dust cores or magnet shielding materials. These can be used as magnetic cores for electromagnetic deflection-type Braun tube yokes, reactors, transformers, noise filters, choke coils, and so forth.

As described above, the present invention enables to produce molded products having excellent heat dimensional stability, chemical resistance and mechanical strength, with high productivity.

EXAMPLES

Resin compositions were prepared using metal or alloy powders, thermoplastic resins and fiber reinforcing materials as shown below. In this preparation, a dispersing machine, High-Speed Mixer (FS-GS-1, manufactured by Fukae Kogyo Co., Ltd.) was used.

(1) Thermoplastic Resins

PPS (produced by Idemitsu Petrochemical Co., Ltd.) Intrinsic viscosity: 0.2 dl/g (260° C., a-chloronaphthalene)

PEEK (produced by Mitsui Toatsu Co., Ltd.) Intrinsic viscosity: 0.85 dl/g (60° C., p-chlorophenol)

PEN-R (produced by Idemitsu Kosan Co., Ltd.) Intrinsic viscosity: 0.97 dl/g (60° C., p-chlorophenol)

PEN-N (produced by Idemitsu Kosan Co., Ltd.) Intrinsic viscosity: 0.8 dl/g (60° C., p-chlorophenol)

PEN-H (produced by Idemitsu Kosan Co., Ltd.) Intrinsic viscosity: 1.5 dl/g (60° C., p-chlorophenol)

PEN-B (produced by Idemitsu Kosan Co., Ltd.) Intrinsic viscosity: 1.5 dl/g (60° C., p-chlorophenol) (1) PEN-R, (2) PEN-N, (3) PEN-H and (4) PEN-B as used herein refers to, respectively, (1) a polymer of 2,6dichlorobenzonitrile and resorcinol, (2) a polymer of 2,6dichlorobenzonitrile and dihydroxynaphthalene, (3) a polymer of 2,6-dichlorobenzonitrile and hydroquinone, and (4) a polymer of 2,6-dichlorobenzonitrile and biphenol.

(2) Coupling Agents

Silane coupline agent (N-β-aminoethyl-γ-aminopropyltrimethoxysilane, produced by Nippon Yunicar Co., Ltd.)

(3) Metal or Alloy Powders

| Type | Average Particle Diameter (μm) |
|---|---|
| Iron powder | 10 |
| Aluminum powder | 5.3 |
| Permalloy powder | 5 |
| Nickel silver powder | 5 |
| Brass powder | 7 |
| Carbon steel | 5.0 |

All were produced by Takeuchi Kinzoku Hakufun Kogyo Co., Ltd.

Metal powders tested for the structural material are shown below.

| Type | Apparent Density | Particle Size Distribution Range (μm) | Lot No. |
|---|---|---|---|
| Reduced iron powder*1 | 2.7 | 37–150 | Fe-1 |
| Reduced iron powder*2 | 2.3 | 80–150 | Fe-2 |
| Brass*2 | 2.7 | 37–150 | Brass-3 |
| Nickel silver | 2.7 | 37–150 | Nickel Silver All |
| Aluminum | 1.0 | 37–60 | All |
| Stainless steel*3 | 2.7 | 37–150 | SUS-1 |
| Stainless steel*3 | 2.3 | 80–180 | SUS-2 |

*1Produced by Takeuchi Kinzoku Hakufun Kogyo Co., Ltd.
*2Containing 60 wt % of Cu
*3SUS 314

Inorganic powders tested for the magnetic core are shown below.

| Type | Supplier | Particle Size Distribution Range (μm) |
|---|---|---|
| Permalloy | Takeuchi Kinzoku Hakufun Co., Ltd. | 38–150 |
| Mo-Permalloy | Takeuchi Kinzoku Hakufun Co., Ltd. | 38–150 |
| Amorphous Alloy | Riken Co., Ltd. | 38–150 |
| Carbonyl Iron Powder C | Takeuchi Kinzoku Hakufun Co., Ltd. | average particle diameter 8 |
| Mn—Zn Ferrite | Toda Kogyo Co., Ltd. | average particle diameter 3.5 |
| Sendust | Takeuchi Kinzoku Hakufun Co., Ltd. | average particle diameter 5 |

The resin compositions for the structural material and magnetic core were prepared by the following method.

The metal powder was previously subjected to coupling treatment. The amount of the coupling agent used in the treatment was 0.5 wt % of the metal powder. Under an atmosphere of nitrogen stream, the resin and the coupling agent (1 wt % based on the powder) were dissolved in 500 ml of the solvent in the High-Speed Mixer while dispersing to prepare a resin solution. Then the metal powder (the total amount of the resin and the metal powder was 1 kg) was introduced into the resin solution and then mixed and dispersed for ten minutes while stirring with an agitator at 1,000 rpm. While stirring with the agitator at 1,000 rpm, the mixture was once cooled to room temperature, and then the solvent was removed at 100° to 180° C. under a reduced pressure of 10 mmhg to obtain a resin-coated powder.

The type of the resin used, and dissolving conditions are shown below.

| | Solvent | Temp. (°C.) |
|---|---|---|
| PPS | α-Chloronaphthalene | 250 |
| PEEK | α-Chloronaphthalene | 250 |
| PEN-R | N-methylpyrrolidone | 190 |
| PEN-B | N-methylpyrrolidone | 190 |
| PEN-H | N-methylpyrrolidone | 190 |
| PEN-N | N-methylpyrrolidone | 190 |

The resin-coated powder obtained above was compression molded at room temperature under a pressure of 5 ton/cm$^2$ and then was subjected to heat treatment for 10 minutes.

The compression molded product of the composition for the structural material was measured for cohesive force and tensile strength.

These measurements were conducted under the following conditions.

| Cohesive force; | JIS R1601 |
|---|---|
| Tensile strength; | JSPM Standard 2-64 |
| Hardness; | JIS Z 2245 |
| | JIS Z 2244 |

These results are shown in Table 3.

The resin composition for the magnetic core was measured for coefficient of linear expansion, heat distortion temperature, and magnetic characteristics.

These measurements were conducted under the following conditions.

Coefficient of linear expansion; ASTM-D 648
Heat distortion temperature; ASTM-D 696
Dimensional change due to water absorption; room temperature, equilibrium
Magnetic characteristics; After fabrication of a magnetic core, an AC initial permeability was measured at a frequency of 100 Hz with an LRC meter.

These results are shown in Table 4.

(4) Fiber Reinforcing Material

Glass Fiber (GF) : TP76 produced by Nippon Itagarasu Co., Ltd., diameter 13 μm, length 3 mm
Carbon fiber (CF): T300 produced by Toray Co., Ltd., diameter 7 gm, length 3 m

Preparation of Resin Composition (Resin-Coated Powder)

Under an atmosphere of nitrogen stream, 1 liter of a resin solution prepared by dissolving the resin and the coupling agent (1 wt % based on the powder) was added to the powder and reinforcing fiber in the High-Speed Mixer (150° C.) while stirring with an agitator (1,000 rpm), and mixed and dispersed for 5 minutes. Then, the solvent was removed at 150° C. and under a reduced pressure of 10 mmhg to obtain a resin-coated powder. The slurry concentration was such that irrespective of the specific gravity of the powder and the amount of the resin, the solvent was 1 liter per kilogram of the total amount of the powder and the resin.

The type of the resin used and the dissolving conditions were as follows.

PPS (produced by Idemitsu Petrochemical Co., Ltd.): temperature 250° C., solvent α-chloronaphthalene PEEK (produced by Mitsui Toatsu Co., Ltd.): temperature 250° C., solvent a-chloronaphthalene PEN-R (produced by Idemitsu Kosan Co., Ltd.): temperature 190° C., solvent N-methyl-2-pyrrolidone The resin-coated powder obtained above was compression molded at room temperature under a pressure of 5 ton/cm 2.

The compression molded product was measured for heat distortion temperature, coefficient of linear expansion, and chemical resistance. The results are shown in Tables 1 and 2.

These measurements were conducted under the following conditions.

Heat distortion temperature: ASTM D-648

Coefficient of linear expansion: Measured at 30° to 150° C. according to ASTM D-696.

Chemical resistance: According to JIS-K7114, an examination with the eye and a measurement of dimensional changes were conducted.

TABLE 12

| Chemical | Chemical Resistance |
|---|---|
| Hydrochloric acid (10%) | ⊚ |
| Sulfuric acid (10%) | ⊚ |
| Diluted nitric acid (5%) | ⊚ |
| Sodium hydroxide (50%) | ⊚ |
| Concentrated ammonia water | ⊚ |
| Sodium chloride (saturated) | ⊚ |
| Potassium carbonate (saturated) | ⊚ |
| Formic acid (10%) | ⊚ |
| Acetic acid | ⊚ |
| Pyridine | ⊚ |
| Benzene | ⊚ |
| Toluene | ⊚ |
| Xylene | ⊚ |
| Methyl alcohol | ⊚ |
| Butyl alcohol | ⊚ |
| Formalin | ⊚ |
| Acetone | ⊚ |
| Methyl alcohol | ⊚ |
| Ethyl acetate | ⊚ |
| Diethyl ether | ⊚ |
| Trichloroethylene | ⊚ |
| Carbon tetrachloride | ⊚ |

⊚: No change in weight and dimensions

TABLE 13

| Resin | | Filler | | Fiber Reinforcing Material | | Composition | | | Coefficient of Linear Expansion ($10^{-5}$/°C.) | Heat Distortion Temperature (°C.) |
|---|---|---|---|---|---|---|---|---|---|---|
| Type of Resin | Volume Fraction (vol %) | Type of Filler | Volume Fraction (vol %) | Type of Fiber | Volume Fraction (vol %) | Resin (wt %) | Filler (wt %) | Fiber (wt %) | | |
| PEN-R | 10 | Iron powder | 75 | GF | 15 | 2.06 | 91.99 | 5.95 | 2.01 | 315 |
| PEN-R | 10 | Iron powder | 75 | CF | 15 | 2.09 | 93.50 | 4.40 | 2.01 | 318 |
| PEN-R | 10 | Al powder | 90 | — | — | 5.15 | 94.85 | 0.00 | 2.60 | 310 |
| PEN-R | 10 | Al powder | 75 | CF | 15 | 5.42 | 83.18 | 11.40 | 2.94 | 305 |
| PEN-R | 10 | Carbon steel | 90 | — | — | 1.84 | 98.16 | 0.00 | 1.42 | 310 |
| PEN-R | 35 | Carbon steel | 65 | — | — | 8.31 | 91.69 | 0.00 | 2.31 | 304 |
| PEN-R | 10 | Permalloy | 90 | — | — | 1.67 | 98.33 | 0.00 | 1.54 | 312 |
| PEN-R | 35 | Permalloy | 65 | — | — | 7.59 | 92.41 | 0.00 | 2.39 | 303 |
| PEN-R | 10 | Brass | 90 | — | — | 1.69 | 98.31 | 0.00 | 2.25 | 311 |
| PEN-R | 35 | Brass | 65 | — | — | 7.69 | 92.31 | 0.00 | 2.00 | 303 |
| PEEK | 10 | Nickel silver | 90 | — | — | 1.62 | 98.38 | 0.00 | 2.00 | 312 |
| PEEK | 35 | Nickel silver | 65 | — | — | 7.40 | 92.60 | 0.00 | 2.72 | 304 |

TABLE 14

| No. | Metal Powder | Resin | Amount of Resin (vol %) | Amount of Resin Charged (g) | Pressure Applied (ton/cm$^2$) | Heat Treatment Temperature (°C.) | Cohesive Force (kg/cm$^2$) | Hardness | Coefficient of Thermal Expansion ($10^{-5}$/°C.) | Heat Distortion Temperature (°C.) |
|---|---|---|---|---|---|---|---|---|---|---|
| Example 69 | Fe-1 | PEEK | 5 | 9.4 | 5 | 410 | 1300 | 68*3 | 1.4 | 330 |
| Example 70 | Fe-1 | PEEK | 10 | 19.6 | 5 | 410 | 1600 | 70*3 | 1.5 | 325 |
| Example 71 | Fe-1 | PEEK | 20 | 43.2 | 5 | 410 | 900 | 54*3 | 1.9 | 310 |
| Example 72 | Fe-1 | PEEK | 2 | 3.5 | 5 | 410 | 400 | 69*3 | 1.2 | 310 |
| Example 73 | Fe-1 | PEEK | 50 | 156.6 | *1 | *1 | 1600 | 100*4 | 3.0 | 280 |
| Example 74 | Fe-1 | — | 0 | 0 | 5 | 410 | 350 | 23*3 | 1.4 | — |
| Example 75 | Fe-1 | PEN-R | 5 | 9.4 | 5 | 370 | 1400 | 70*3 | 1.2 | 330 |
| Example 76 | Fe-1 | PEN-R | 10 | 19.6 | 5 | 370 | 1700 | 73*3 | 1.5 | 335 |
| Example 77 | Fe-1 | PEN-R | 20 | 43.2 | 5 | 370 | 950 | 60*3 | 1.7 | 330 |
| Example 78 | Fe-1 | PEN-R | 2 | 3.5 | 5 | 370 | 430 | 69*3 | 1.2 | 315 |
| Example 79 | Fe-1 | PEN-R | 50 | 146.6 | *1 | *5 | 1640 | 120*4 | 2.9 | 290 |
| Example 80 | *2 | PEN-R | 10 | 19.6 | 5 | 410 | 560 | 68*3 | 1.5 | 300 |
| Example 81 | Fe-1 | PPS | 10 | 19.6 | 5 | 370 | 1300 | — | 1.3 | 280 |
| Example 82 | Fe-1 | PEN-H | 10 | 19.6 | 5 | 390 | 1400 | — | 1.5 | 345 |
| Example 83 | Fe-1 | PEN-B | 10 | 19.6 | 5 | 390 | 1500 | — | 1.4 | 355 |
| Example 84 | Fe-2 | PEN-R | 10 | 19.6 | 5 | 370 | 1800 | — | 1.4 | 335 |
| Example 85 | Fe-2 | PEEK | 10 | 19.6 | 5 | 410 | 1700 | — | 1.5 | 325 |
| Exmaple 86 | Fe-2 | PEN-N | 10 | 19.6 | 5 | 380 | 1650 | — | 1.6 | 350 |
| Example 87 | Fe-2 | PEN-B | 10 | 19.6 | 5 | 380 | 1680 | — | 1.6 | 355 |
| Example 88 | Fe-2 | PPS | 10 | 19.6 | 5 | 380 | 1450 | — | 1.3 | 280 |
| Example 89 | Fe-2 | PEN-H | 10 | 19.6 | 5 | 380 | 1500 | — | 1.6 | 340 |
| Example 90 | Aluminum | Pen-R | 10 | 50.6 | 5 | 370 | 1760 | — | 2.5 | 330 |
| Example 91 | Nickel silver | PEN-R | 10 | 16.8 | 5 | 410 | 1580 | — | 2.1 | 325 |
| Example 92 | Brass | PEN-B | 10 | 17.4 | 5 | 380 | 1630 | — | 2.2 | 355 |
| Example 93 | Brass | PEEK | 10 | 17.8 | 5 | 380 | 1580 | — | 2.4 | 325 |
| Example 94 | SUS 1 | PEN-H | 10 | 18.2 | 5 | 380 | 1720 | — | 1.9 | 354 |

TABLE 14-continued

| No. | Metal Powder | Resin | Amount of Resin (vol %) | Amount of Resin Charged (g) | Pressure Applied (ton/cm²) | Heat Treatment Temperature (°C.) | Cohesive Force (kg/cm²) | Hardness | Coefficient of Thermal Expansion (10⁻⁵/°C.) | Heat Distortion Temperature (°C.) |
|---|---|---|---|---|---|---|---|---|---|---|
| Example 95 | SUS 2 | PEN-R | 10 | 18.2 | 5 | 380 | 1800 | — | 2.2 | 345 |

*¹Heat press molding at 410° C. and 400 kg/cm² followed by crystallization at 260° C.
*²Atomized iron powder (spherical), having an average particle diameter of 10 μm was used.
*³Rockwell, F scale
*⁴Rockwell, M scale
*⁵Heat press molding at 360° C. and 400 kg/cm2 followed by crystallization at 260° C.

TABLE 15

| No. | Soft Magnetic Powder | Resin | Amount of Resing (vol %) | Amount of Resin Charged (g) | Heat Treatment Temperature (°C.) | Heat Distortion Temperature (°C.) | Coefficient of Linear Expansion (10⁻⁵/°C.) | Change in Dimensions due to Water Absorption (%) | Initial Permeability ($\mu_{iac}$) | Volume Specific Resistance (Ω·cm) |
|---|---|---|---|---|---|---|---|---|---|---|
| Example 69 | Permalloy | PEEK | 10 | 16.7 | 410 | 320 | 1.54 | 0.01 | 75 | 0.4 |
| Example 70 | Permalloy | PPS | 10 | 16.7 | 370 | 260 | 1.53 | <0.01 | 73 | 0.4 |
| Example 71 | Permalloy | PEN-R | 5 | 8.13 | 380 | 330 | 1.24 | <0.01 | 80 | 0.2 |
| Example 72 | Cendust | PEN-R | 10 | 20.5 | 370 | 335 | 1.93 | <0.01 | 65 | 0.8 |
| Example 73 | Cendust | PPS | 10 | 20.5 | 370 | 260 | 2.09 | <0.01 | 64 | 0.8 |
| Example 74 | Cendust | PEN-N | 5 | 9.89 | 390 | 340 | 1.95 | <0.01 | 68 | 0.5 |
| Example 75 | Carbonyl Iron Powder C | PEEK | 10 | 18.3 | 410 | 310 | 1.55 | 0.01 | 53 | 0.1 |
| Example 76 | Carbonyl Iron Powder C | PPS | 10 | 18.3 | 370 | 260 | 1.57 | <0.01 | 52 | 0.1 |
| Example 77 | Amorphous Alloy | PEN-R | 5 | 20.3 | 380 | 335 | 1.32 | <0.01 | 180 | 0.1 |
| Example 78 | Mo-Permalloy | PEN-B | 10 | 16.3 | 390 | 345 | 1.45 | <0.01 | 130 | 0.4 |
| Example 79 | Mo-Permalloy | PPS | 10 | 16.3 | 370 | 262 | 1.56 | <0.01 | 128 | 0.4 |
| Example 80 | Mn—Zn Ferrite | PEN-R | 5 | 13.1 | 380 | 330 | 1.20 | <0.01 | 15 | >10⁴ |

What is claimed is:

1. A method for preparing a magnetic powder material comprising 99.5 to 60% by volume (99.9 to 85% by weight) of magnetic powder and 0.5 to 40% by volume (0.1 to 15% by weight) of a polymer having a repeating unit represented by the formula:

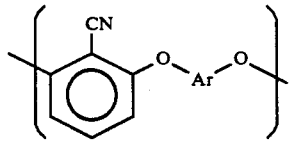
(I)

wherein Ar represents

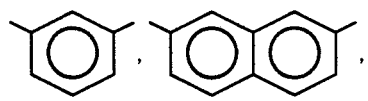

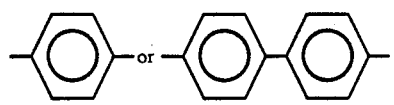

and a limiting viscosity (η) in p-chlorophenol as a solvent at 60° C. of 0.2 dl/g or more, which comprises preparing a mixture of the magnetic powder and a solution of the polymer by dissolving the polymer in N-methylpyrrolidone at a temperature of at least 190° C. and by dispersing the magnetic powder within the solution, and then adding a precipitating solvent in which the polymer is insoluble or little soluble to the mixture, thereby precipitating the polymer onto the magnetic powder.

2. A method for preparing a magnetic powder material comprising 99.5 to 60% by volume (99.9 to 85% by weight) of magnetic powder and 0.5 to 40% by volume (0.1 to 15% by weight) of a polymer having a repeating unit represented by the formula:

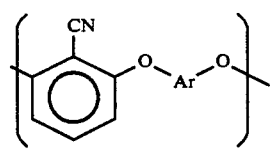
(I)

wherein Ar represents

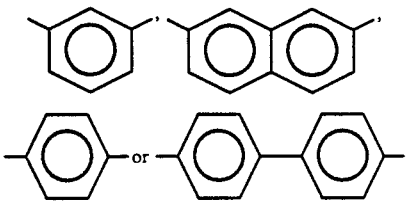

and a limiting viscosity (η) in p-chlorophenol as a solvent at 60° C. of 0.2 dl/g or more, which comprises volatilizing and evaporating N-methylpyrrolidone from a mixture containing the magnetic powder within a solution of the polymer dissolved in the N-methylpyrrolidone at a temperature of at least 190° C., thereby precipitating the polymer onto the magnetic powder.

3. A method for preparing a magnetic powder material comprising 99.5 to 60% by volume (99.9 to 85% by weight) of magnetic powder and 0.5 to 40% by volume (0.1% to 15% by weight) of a polymer having a repeating unit represented by the formula:

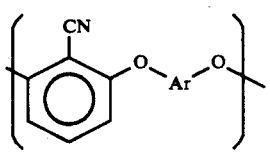   (I)

wherein Ar represents

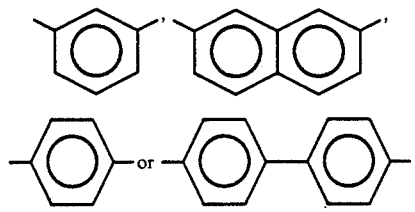

and a limiting viscosity (η) in p-chlorophenol as a solvent at 60° C. of 0.2 dl/g or more, which comprises preparing a mixture of the magnetic powder and a solution of the polymer by dissolving the polymer in N-methylpyrrolidone at a temperature of at least 190° C. and by dispersing the magnetic powder within the solution, and then cooling the mixture of the polymer dissolved in the N-methylpyrrolidone and the magnetic powder dispersed therein thereby precipitating the polymer onto the magnetic powder.

4. A method for preparing a magnetic powder material comprising 99.5 to 60% by volume (99.9 to 85% by weight) of magnetic powder and 0.5 to 40% by volume (0.1 to 15% by weight) of a polymer having a repeating unit represented by the formula:

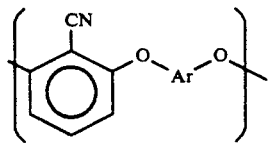   (I)

wherein Ar represents

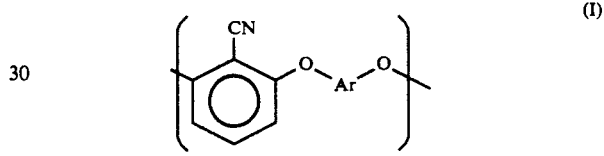

and a limiting viscosity (η) in p-chlorophenol as a solvent at 60° C. of 0.2 dl/g or more, which comprises effecting dispersion, mixing and grinding of a gel prepared by dissolving the polymer in N-methylpyrrolidone and by heating at a temperature of at least 190° C. and then cooling, with the magnetic powder, and simultaneously effecting volatilization and evaporation of the N-methylpyrrolidone.

5. A method for preparing a resin-bonded magnet which comprises effecting injection molding of a magnetic powder material comprising 99.5 to 60% by volume (99.9 to 85% by weight) of magnetic powder and 0.5 to 40% by volume (0.1 to 15% by weight) of a polymer having a repeating unit represented by the formula:

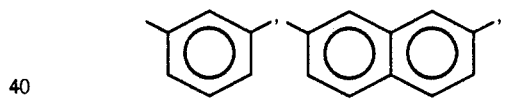   (I)

wherein Ar represents

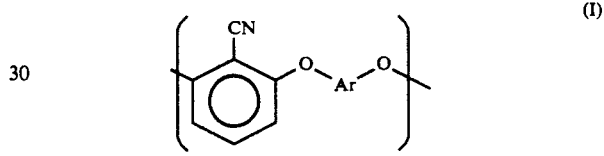

and a limiting viscosity (η) in p-chlorophenol as a solvent at 60° C. of 0.2 dl/g or more; said magnetic powder being prepared by dissolving said polymer in N-methylpyrrolidone at a temperature of at least 190° C., dispersing the magnetic powder within the polymer solution and, thereafter, treating the resulting mixture to remove the N-methylpyrrolidone and to adhere the polymer to the magnetic powder.

6. A method according to claim 5 wherein prior to effecting the injection molding, the magnetic powder material is subjected to a grinding treatment.

* * * * *